US010608294B2

(12) United States Patent
Sasaki et al.

(10) Patent No.: US 10,608,294 B2
(45) Date of Patent: Mar. 31, 2020

(54) POWER STORAGE DEVICE, CELL, BALANCE OPERATION METHOD, AND PROGRAM

(71) Applicant: NEC CORPORATION, Tokyo (JP)

(72) Inventors: Hiroshi Sasaki, Tokyo (JP); Yasushi Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 111 days.

(21) Appl. No.: 15/576,368

(22) PCT Filed: May 24, 2016

(86) PCT No.: PCT/JP2016/065265
§ 371 (c)(1),
(2) Date: Nov. 22, 2017

(87) PCT Pub. No.: WO2016/190293
PCT Pub. Date: Dec. 1, 2016

(65) Prior Publication Data

US 2018/0151919 A1    May 31, 2018

(30) Foreign Application Priority Data

May 25, 2015   (JP) ................................ 2015-105597

(51) Int. Cl.
| | | |
|---|---|---|
| *H01M 10/42* | (2006.01) | |
| *H02J 7/02* | (2016.01) | |
| *H01M 10/48* | (2006.01) | |
| *H01M 10/44* | (2006.01) | |
| *H02J 7/00* | (2006.01) | |

(52) U.S. Cl.
CPC ......... *H01M 10/425* (2013.01); *H01M 10/44* (2013.01); *H01M 10/48* (2013.01); *H01M 10/486* (2013.01); *H02J 7/00* (2013.01); *H02J 7/02* (2013.01); *H01M 2010/4271* (2013.01); *H01M 2010/4278* (2013.01)

(58) Field of Classification Search
CPC .... H01M 10/425; H01M 10/44; H01M 10/48; H01M 10/486; H01M 2010/4271; H01M 2010/4278; H02J 7/00; H02J 7/02
See application file for complete search history.

(56) References Cited

U.S. PATENT DOCUMENTS

| | | | | |
|---|---|---|---|---|
| 2014/0210415 A1* | 7/2014 | Ohmori | ................. | H01M 10/44 320/118 |
| 2015/0035495 A1* | 2/2015 | Yoshida | .............. | H01M 10/425 320/134 |

FOREIGN PATENT DOCUMENTS

| | | | | |
|---|---|---|---|---|
| JP | 2004-343867 | | 12/2004 | |
| JP | 2006-507790 | | 3/2006 | |
| JP | 2006-302951 | | 11/2006 | |
| JP | 2010-16928 | | 1/2010 | |
| JP | 2011-155751 | | 8/2011 | |
| JP | 2013118757 A | * | 6/2013 | |
| JP | 2013-258828 | | 12/2013 | |
| JP | 2014-171323 | | 9/2014 | |
| WO | WO 2011/102241 | | 8/2011 | |
| WO | WO 2013/021589 | | 2/2013 | |
| WO | WO-2013128809 A1 | * | 9/2013 | .......... H01M 10/425 |

OTHER PUBLICATIONS

Machine translation for Kato et al., JP 2013-118757 A. (Year: 2019).*
International Search Report dated Aug. 9, 2016, in corresponding PCT International Application.
Partial English Translation of Written Opinion of the International Searching Authority from the Japanese Patent Office dated Aug. 9, 2016, in corresponding PCT International Application.

\* cited by examiner

*Primary Examiner* — Laura Weiner
(74) *Attorney, Agent, or Firm* — Finnegan, Henderson, Farabow, Garrett & Dunner, L.L.P.

(57) ABSTRACT

A power storage device includes: a plurality of series-connected battery cells (311); a balance circuit (112) that is provided for each of the plurality of battery cells (311), and is connected with corresponding one of the battery cells; a first temperature sensor (111) that is provided for every one or more of the balance circuits (112), and measures a temperature of a corresponding balance circuit (112); and a control unit (121) that stops an operation of the corresponding balance circuit (112) when a first measured temperature measured by the first temperature sensor (111) is equal to or more than a first upper reference temperature, and restarts an operation of the corresponding balance circuit (112) when the first measured temperature becomes equal to or less than a first lower reference temperature that is lower than the first upper reference temperature after an operation of the corresponding balance circuit (112) is stopped.

10 Claims, 20 Drawing Sheets

POWER STORAGE DEVICE, CELL, BALANCE OPERATION METHOD, AND PROGRAM

CROSS-REFERENCE TO RELATED PATENT APPLICATIONS

This application is a National Stage Entry of International Application No. PCT/JP2016/065265, filed May 24, 2016, which claims priority from Japanese Patent Application No. 2015-105597, filed May 25, 2015. The entire contents of the above-referenced applications are expressly incorporated herein by reference.

TECHNICAL FIELD

The present invention relates to a technique of controlling a cell balance operation of a power storage device.

BACKGROUND ART

Examples of a technique relating to a balance circuit provided in a power storage device are disclosed in, for example, PTLs (Patent Literatures) described below.

PTL 1 described below discloses a power storage device in which a balance circuit of a passive balance type including a resistor, and a temperature sensor are provided for each of a plurality of electricity storage elements (battery cells). PTL 1 also discloses a technique of controlling an ON/OFF state of a switch of each balance circuit in such a way that a temperature of the resistor detected by the temperature sensor is maintained at a maximum use temperature during an operation of each balance circuit.

In addition, PTL 2 described below discloses a power storage device that includes an assembled battery constituted of a plurality of series-connected cells, and a cell controller controlling a balance operation of each cell. The cell controller repeats an intermittent operation of cells by selecting one or a plurality of cells having a voltage value equal to or more than a cell capacity adjustment target voltage, and connecting an intermittent operation unit to the selected cell or cells. Accordingly, residual capacity fluctuation among the cells is reduced.

In addition, PTL 3 described below discloses a technique of adjusting charge amounts of a plurality of series-connected battery cells by using a cell balance circuit including a resistive element. In particular, PTL 3 discloses a technique in which a battery cell having a higher temperature is connected to the cell balance circuit for a longer period of time and a discharge amount during a balance operation is increased.

In addition, PTL 4 described below discloses a technique in which hysteresis is given to a threshold voltage for use in turning ON/OFF of charge current in order to avoid an unstable charge operation that may be caused by bypassing a power storage unit reaching a charge target voltage in charging of a plurality of series-connected electricity storage units.

In addition, PTL 5 described below discloses a technique in which surplus electric power is regenerated to another cell by using an equalization converter when a charge state of a certain single cell in a battery pack is greater than a target charge state.

CITATION LIST

Patent Literature

[PTL 1] Japanese Laid-open Patent Publication No. 2011-155751
[PTL 2] International Publication WO 2011/102241
[PTL 3] Japanese Laid-open Patent Publication No. 2014-171323
[PTL 4] Japanese Laid-open. Patent Publication No, 2013-258828
[PTL 5] Japanese Laid-open Patent Publication No. 2006-507790

SUMMARY OF THE INVENTION

Technical Problem

When a balance circuit operates, a heat-generating element included in the balance circuit generates heat. Then, this heat may decrease reliability and service life of a neighboring battery cell and other components.

An object of the present invention is to provide a technique of preventing decrease in reliability and service life of a neighboring battery cell and other components due to heat generation of a balance circuit.

Solution to Problem

The present invention provides a power storage device including:
  a plurality of series-connected battery cells;
  a balance circuit that is provided for each of the plurality of battery cells, and is connected with corresponding one of the battery cells;
  a first temperature sensor that is provided for every one or more of the balance circuits, and measures a temperature of a corresponding balance circuit; and
  a control means that stops an operation of the corresponding balance circuit when a first measured temperature measured by the first temperature sensor is equal to or more than a first reference temperature, and restarts the operation of the corresponding balance circuit when the first measured temperature becomes equal to or less than a second reference temperature that is lower than the first reference temperature after the operation of the corresponding balance circuit is stopped because the first measured temperature becomes equal to or more than the first reference temperature.

The present invention provides a cell balance operation method including,
  by a power storage device that includes:
  a plurality of series-connected battery cells;
  a balance circuit that is provided for each of the plurality of battery cells, and is connected with corresponding one of the battery cells; and
  a first temperature sensor that is provided for every one or more of the balance circuits, and measures a temperature of a is corresponding balance circuit,
  stopping an operation of the corresponding balance circuit when a first measured temperature measured by the first temperature sensor is equal to or more than a first reference temperature, and restarting the operation of the corresponding balance circuit when the first measured temperature becomes equal to or less than a second reference temperature that is lower than the first reference temperature after the operation of the corresponding balance circuit is stopped because the first measured temperature becomes equal to or more than the first reference temperature.

The present invention provides a program for causing a power storage device that includes:
  a plurality of series-connected battery cells;

a balance circuit that is provided for each of the plurality of battery cells, and is connected with corresponding one of the battery cells; and a first temperature sensor that is provided for every one or more of the balance circuits, and measures a temperature of a corresponding balance circuit, to implement a control function of stopping an operation of the corresponding balance circuit when a first measured temperature measured by the first temperature sensor is equal to or more than a first reference temperature, and restarting the operation of the corresponding balance circuit when the first measured temperature becomes equal to or less, than a second reference temperature that is lower than the first reference temperature after the operation of the corresponding balance circuit is stopped because the first measured temperature becomes equal to or more than the first reference temperature.

Advantageous Effects of the Invention

The present invention enables to prevent decrease in reliability and service life of a neighboring battery cell and other components due to heat generation of a balance circuit.

BRIEF DESCRIPTION OF DRAWINGS

The above-described object and other objects, features and advantages will be more apparent from the following preferred example embodiments and the accompanying drawings.

DESCRIPTION OF EMBODIMENTS

Figure 1:
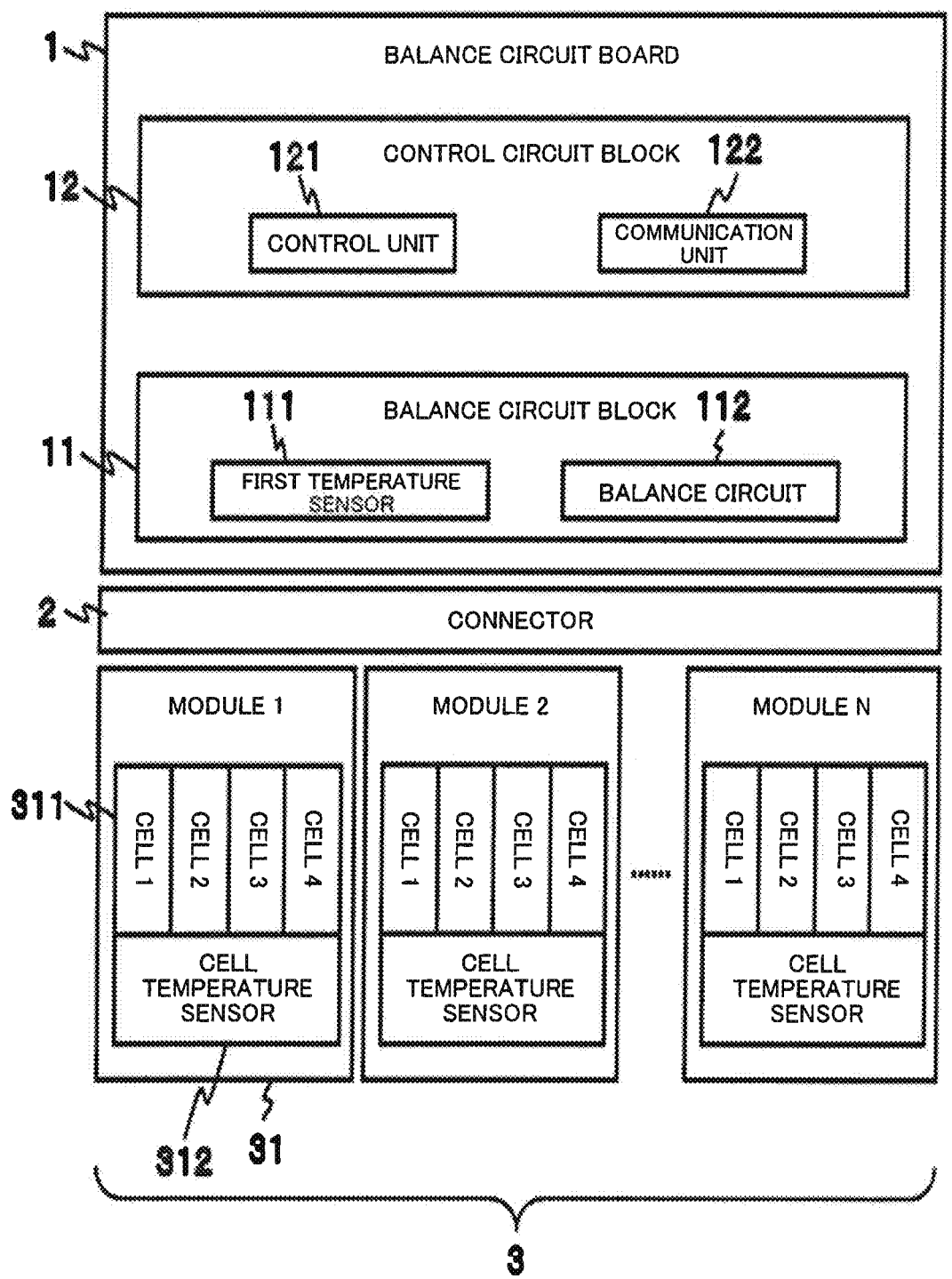
FIG. 1 is a diagram conceptually illustrating a configuration of a power storage device according to a first example embodiment.

Example embodiments of the present invention will be described below by using the drawings. Note that like components are assigned with like reference numerals throughout all the drawings, and description therefor will be omitted as appropriate.

Note that components illustrated in each drawing are implemented by an arbitrary combination of hardware and software, mainly by a central processing unit (CPU) of an arbitrary computer, a memory, a program loaded on a memory for implementing the components in the drawing, a storage medium for storing the program such as a hard disk, and an interface for network connection. Further, a method and a device for implementing the components include various modification examples.

First Example Embodiment

Processing Configuration

FIG. 1 is a diagram conceptually illustrating a configuration of a power storage device according to a first example embodiment. As illustrated in FIG. 1, the power storage device according to the present example embodiment includes a battery string 3 of a plurality of series-connected battery modules 31, and a balance circuit board 1 that is connected with the battery string 3 through a connector 2. The connector 2 includes an electrode terminal and a cell temperature sensor terminal on a battery cell 311 basis. Each of the battery modules 31 includes a plurality of series-connected battery cells 311 (four battery cells 311 in an example in FIG. 1). As illustrated in FIG. 1, each of the battery modules 31 may include a cell temperature sensor 312 that measures a temperature of each battery cell 311.

The balance circuit board 1 includes a balance circuit block 11 and a control circuit block 12. The balance circuit block 11 includes a balance circuit 112 for equalizing voltages of the battery cells 311, and a first temperature sensor 111 for measuring a temperature of the balance circuit 112. The control circuit block 12 includes a control unit 121 for controlling an operation of the balance circuit 112, and a communication unit 122 for communicating with a not-illustrated external device and the like.

The balance circuit 112 is provided at least on a battery module 31 basis. In the present example embodiment, the balance circuit 112 is provided for each of the plurality of battery cells 311, and is connected with corresponding one of the battery cells 311. The balance circuit 112 may be a balance circuit of a so-called passive balance type, or may be a balance circuit of a so-called active balance type. Note that, in the following respective example embodiments, a balance circuit of a passive balance type will be described as an example. However, the present invention is not limited to the balance circuit of the passive balance type.

Herein, the passive balance type is a type in which, when the plurality of battery cells 311 have a variation in voltage (discharge capacity), voltages among the plurality of battery cells are equalized by discharging a battery cell having a relatively high voltage with a battery cell having a lowest voltage as a reference. A balance circuit of the passive balance type includes a resistive element for discharging each of battery cells, and a switch element for controlling a balance operation by being switched ON/OFF. On the other hand, an active balance type is a type in which, when a plurality of battery cells have a variation in voltage, voltages among the plurality of battery cells are equalized by moving an electric charge from a battery cell having a large capacity to a battery cell having a small capacity. A balance circuit of the active balance type includes a capacitor or a transformer for moving an electric charge among battery cells, and a switch element for selecting a battery cell to be connected with the capacitor or the transformer. The resistive element and the transformer (inductor element) used in the balance circuit 112 mainly generate heat during a balance operation.

The first temperature sensor 111 is provided for every one or more of the balance circuits 112, and measures a temperature of a corresponding balance circuit 112. In addition, one or more first temperature sensors 111 are provided for a corresponding balance circuit 112. For example, one or more first temperature sensors 111 are provided for each of the balance circuits 112. When a width between the balance circuits 112 is narrow and the like, it may be difficult to provide the first temperature sensor 111 for every balance circuit 112. In such a case, one or more first temperature sensors 111 may be provided for every predetermined number of the balance circuits 112 included in each battery module 31.

A position where the first temperature sensor 111 is placed will be described below.

Figure 2:
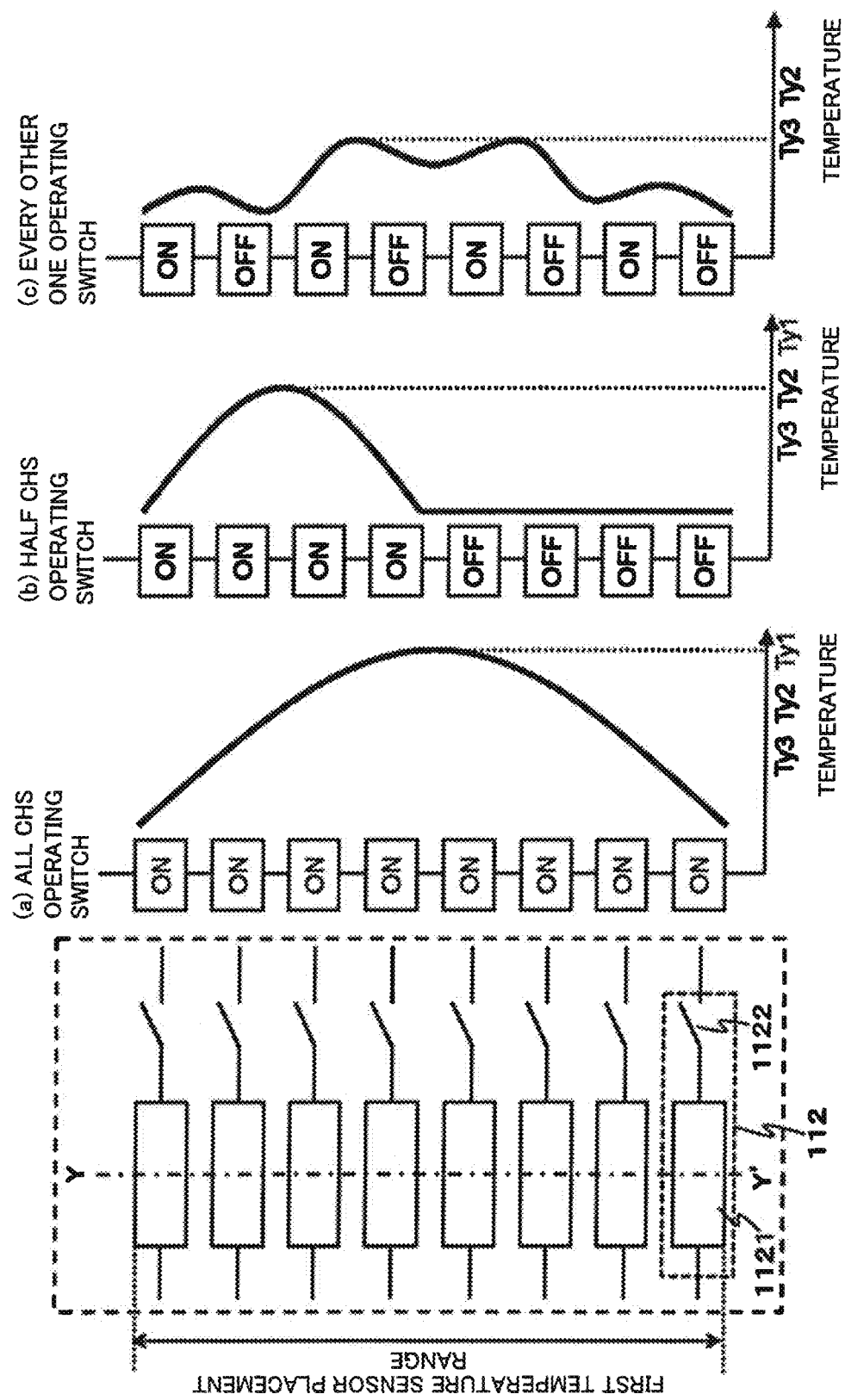
FIG. 2 is a schematic diagram representing a relationship between an operation state of a balance circuit and heat generation distribution in Y-Y' direction.

FIG. 2 is a schematic diagram representing a relationship between an operation state of a balance circuit and heat generation distribution in Y-Y' direction. In an example in FIG. 2, eight balance circuits 112 respectively including a heat-generating element 1121 (a resistive element in the case of the passive balance type) and a switch element 1122 are disposed. FIG. 2(a) exemplifies temperature distribution in Y-Y' direction when the balance circuits 112 of all channels perform balance operations. Note that a channel (CH) means a set of one battery cell 311 and a balance circuit 112 corresponding to the battery cell 311. In the case of FIG. 2(a), a peak of temperature appears at a central part since a heat dissipation performance at the central part is inferior to that at an end part, and the temperature becomes lower as coming closer to end part sides. FIG. 2(b) exemplifies temperature distribution in Y-Y' direction when the balance circuits 112 of upper-half channels perform balance operations. In the case of FIG. 2(b), a peak of temperature appears at a central part of the upper-half channels. FIG. 2(c) exemplifies heat generation distribution in Y-Y' direction when every other one of the balance circuits 112 performs a balance operation. In the case of FIG. 2(c), temperature is low at parts of channels where no balance operation is performed, which results in wave-shaped temperature distribution. In FIG. 2(c), peaks of temperature appear at two points, which are between a third channel and a fourth channel from the top, and between a fifth channel and a sixth channel from the top. In this way, temperature distribution in Y-Y' direction changes in response to a conduction state of the heat-generating element 1121, within a range sandwiched between the heat-generating elements 1121 at both ends. Thus, providing the first temperature sensor 111 in the range sandwiched between the heat-generating elements 1121 at both ends in Y-Y' direction facilitates detection of heat generated from the heat-generating element 1121. Note that, among FIGS. 2(a) to (c), a highest temperature in Y-Y' direction is detected in the case of FIG. 2(a) in which the balance circuits 112 of all the channels operate. At least one first temperature sensor 111 is ideally arranged in such a way as to overlap a center of the range sandwiched between the heat-generating elements 1121 at both ends in Y-Y' direction.

Figure 3:
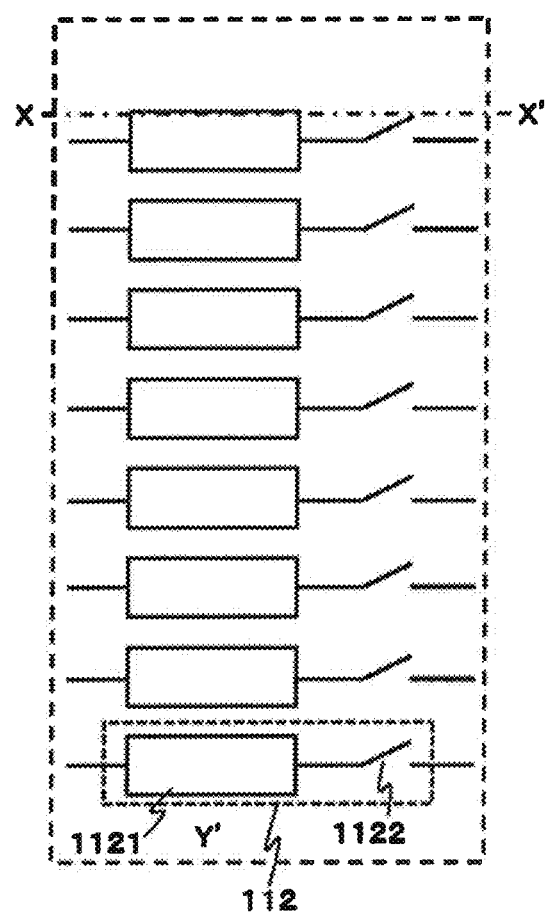
FIG. 3 is a schematic diagram representing a relationship between an operation state of a balance circuit and heat generation distribution in X-X' direction orthogonal to Y-Y' direction.
Figure 3:
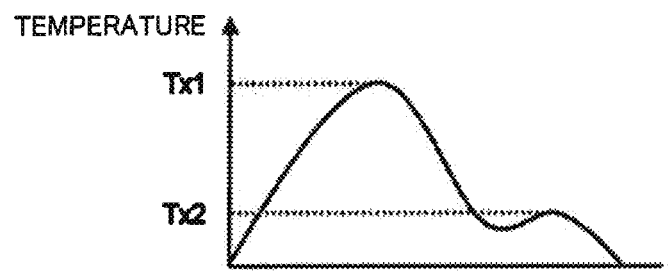

FIG. 3 is a schematic diagram representing a relationship between an operation state of a balance circuit and heat generation distribution in X-X' direction orthogonal to Y-Y' direction. The switch element 1122 generally has small ON-resistance in comparison with that of the heat-generating element 1121. Therefore, when the heat-generating element 1121 is in a conduction state, a peak of temperature appears at a central part of the heat-generating element 1121 in X-X' direction. Thus, the first temperature sensor 111 is ideally arranged in such a way as to overlap a center of the heat-generating element 1121 in X-X' direction.

In addition, it can be predicted from FIGS. 2 and 3 that a point that may reach a highest temperature on a plane of the balance circuit board 1 (hereinafter, also written as a maximum heat-generating point) is a point of intersection between a point that reaches a highest temperature in Y-Y' direction and a point that reaches a highest temperature in X-X' direction when all the corresponding balance circuits 112 operate. Note that it is possible to grasp the maximum heat-generating point also by carrying out a test operation or simulation of the balance circuit board 1 and measuring temperature distribution of the balance circuit board 1 during a balance operation, for example.

When considering a component interval, a wiring interval, an electrical insulation interval, and the like of electrical components such as the heat-generating element 1121 and the first temperature sensor 111, the first temperature sensor 111 cannot always be provided at an ideal position with no error. The first temperature sensor 111 needs to be provided as close as possible to the maximum heat-generating point. As a specific example, when a distance in Y-Y' direction between heat-generating elements 1121 at both ends is denoted by W, a width in X-X' direction of each heat-generating element 1121 is denoted by L, and a coordinate of the maximum heat-generating point that is specified as described in FIGS. 2 and 3 is denoted by (Wymax, Lxmax), a range for providing the first temperature sensor 111 can be defined by the following Expression 1 and Expression 2, for example.

Mathematical 1

Placement Range in $Y\text{-}Y'$ Direction=Wymax±0.3×$W$ (Expression 1)

Placement Range in $X\text{-}X'$ Direction=Lxmax±0.3×$L$ (Expression 2)

Figure 4:
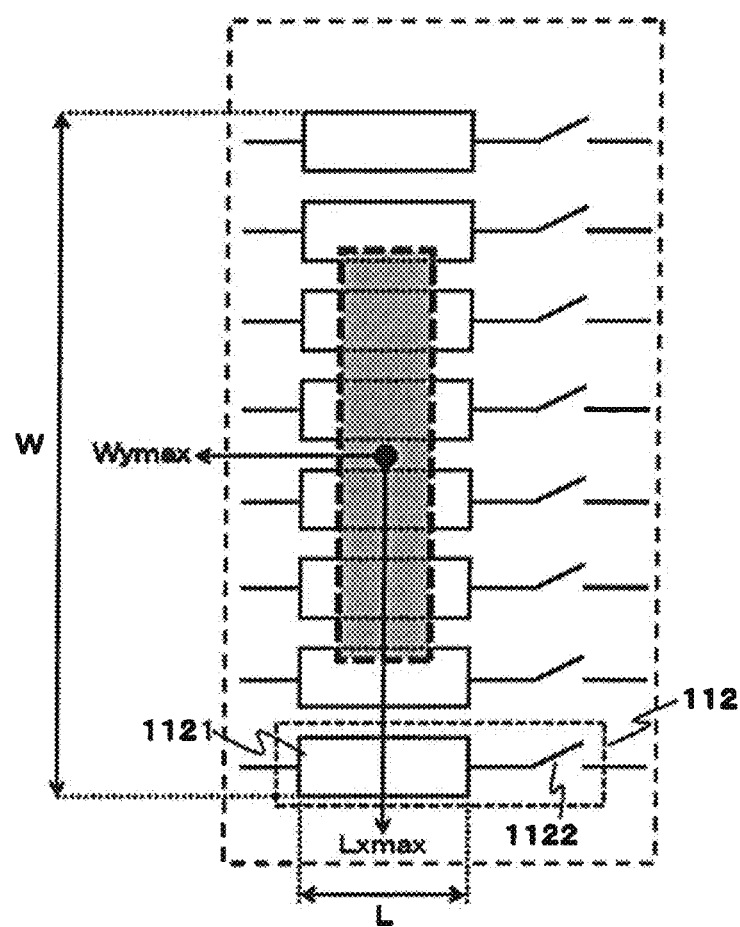
FIG. 4 is a diagram exemplifying a range for providing a first temperature sensor.

This can be illustrated as in FIG. 4. FIG. 4 is a diagram exemplifying a range for providing the first temperature sensor 111. Based on the maximum heat-generating point (Wymax, Lxmax) that is specified as described using FIGS. 2 and 3, the distance W between the balance circuits 112 positioned at both ends, and the width L of the balance circuit 112, a range indicated by slanting lines is defined. The first temperature sensor 111 is provided in such a way as to overlap the range indicated by the slanting lines.

Figure 5:
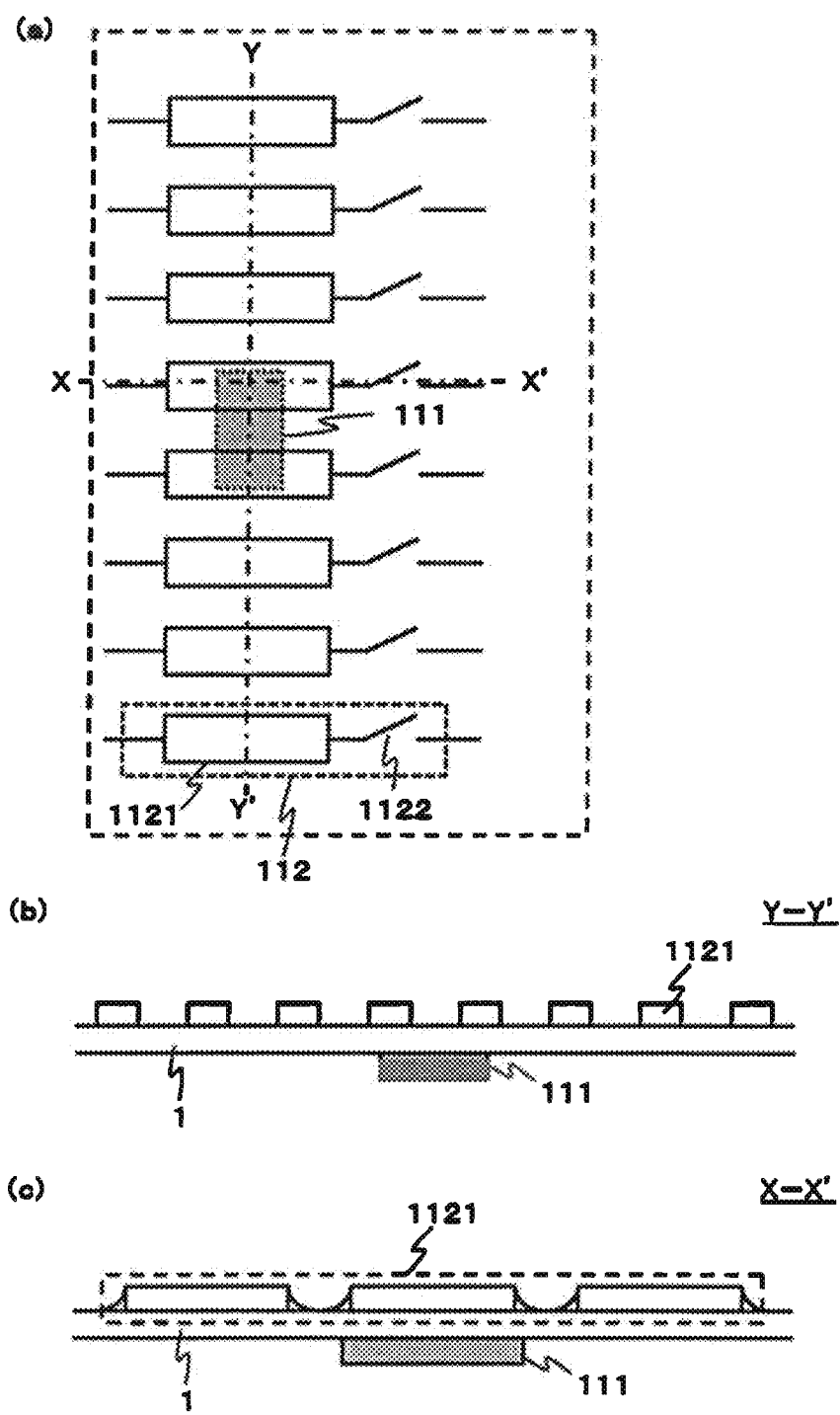
FIG. 5 is a diagram illustrating a first placement example of the first temperature sensor.

FIG. 5 is a diagram illustrating a first placement example of the first temperature sensor 111. FIGS. 5(a), (b), and (c) respectively illustrate a top view, a sectional view in Y-Y' direction, and a sectional view in X-X' direction of the balance circuit board 1 in the first placement example. As illustrated in FIG. 5, for example, the first temperature sensor 111 can be provided on the balance circuit board 1 on a face at rear side of a face provided with the components (the heat-generating element 1121 and the like) of the balance circuit 112. In this case, restriction on arrangement due to other components is reduced, and the first temperature sensor 111 can be provided in such a way as to overlap the maximum heat-generating point that is predicted as described in FIGS. 2 and 3 or is specified by a test operation and the like.

Figure 6:
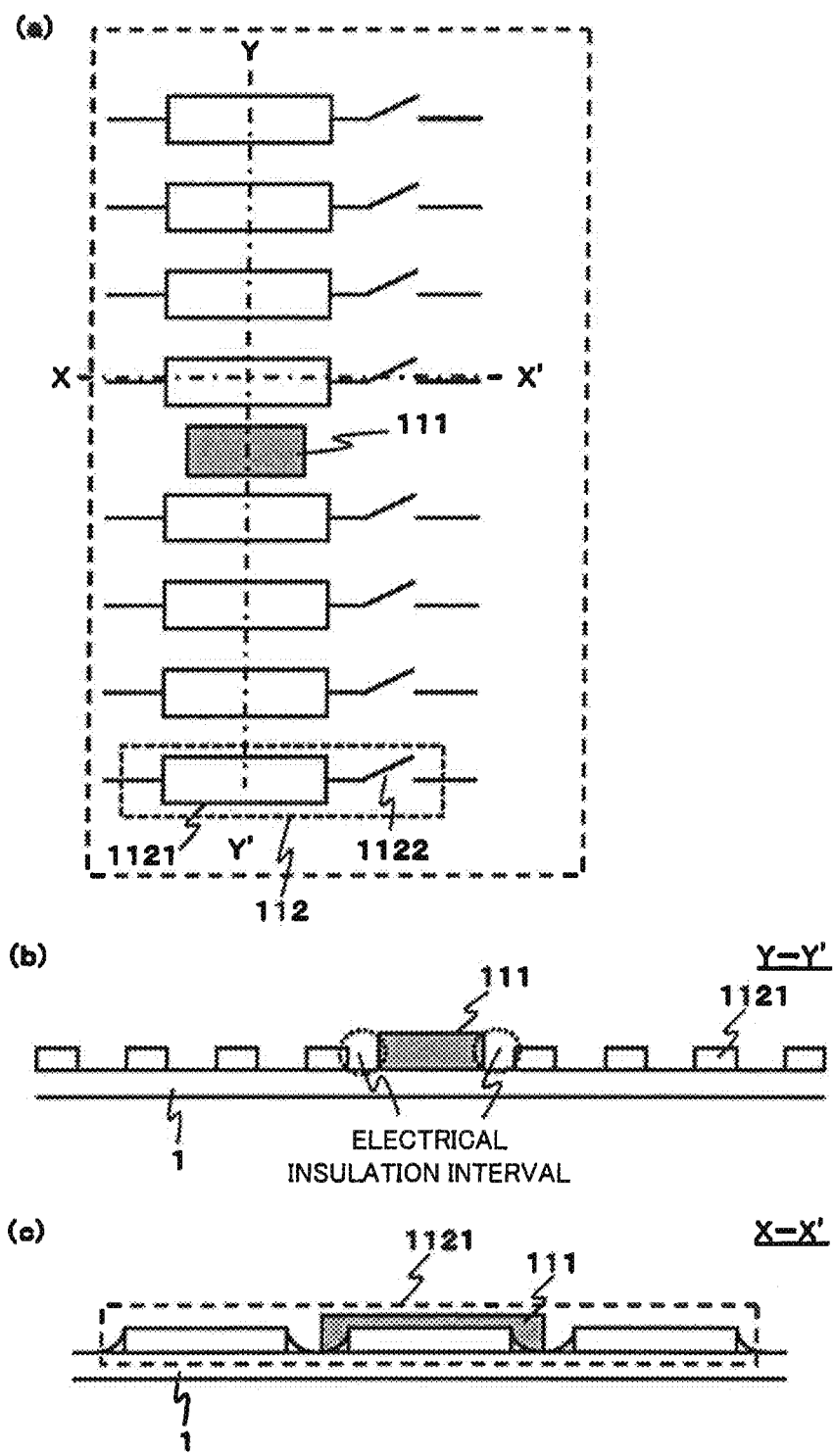
FIG. 6 is a diagram illustrating a second placement example of the first temperature sensor.

FIG. 6 is a diagram illustrating a second placement example of the first temperature sensor 111. FIGS. 6(a), (b), and (c) respectively illustrate a top view, a sectional view in Y-Y' direction, and a sectional view in X-X' direction of the balance circuit board 1 in the second placement example. In the second placement example, a case in which a certain degree of a space is present at a central part of eight balance circuits 112 is assumed. In this case, the first temperature sensor 111 can be provided in the space at the central part, with a physical electrical insulation interval. Also with such a configuration, it becomes possible to provide the first temperature sensor 111 in such a way as to overlap the maximum heat-generating point that is specified as described in FIGS. 2 and 3. In addition, in the example in FIG. 6, the first temperature sensor 111 and the balance circuit 112 may be configured to be insulated from each other by providing an insulator between the first temperature sensor 111 and the balance circuit 112.

Figure 7:
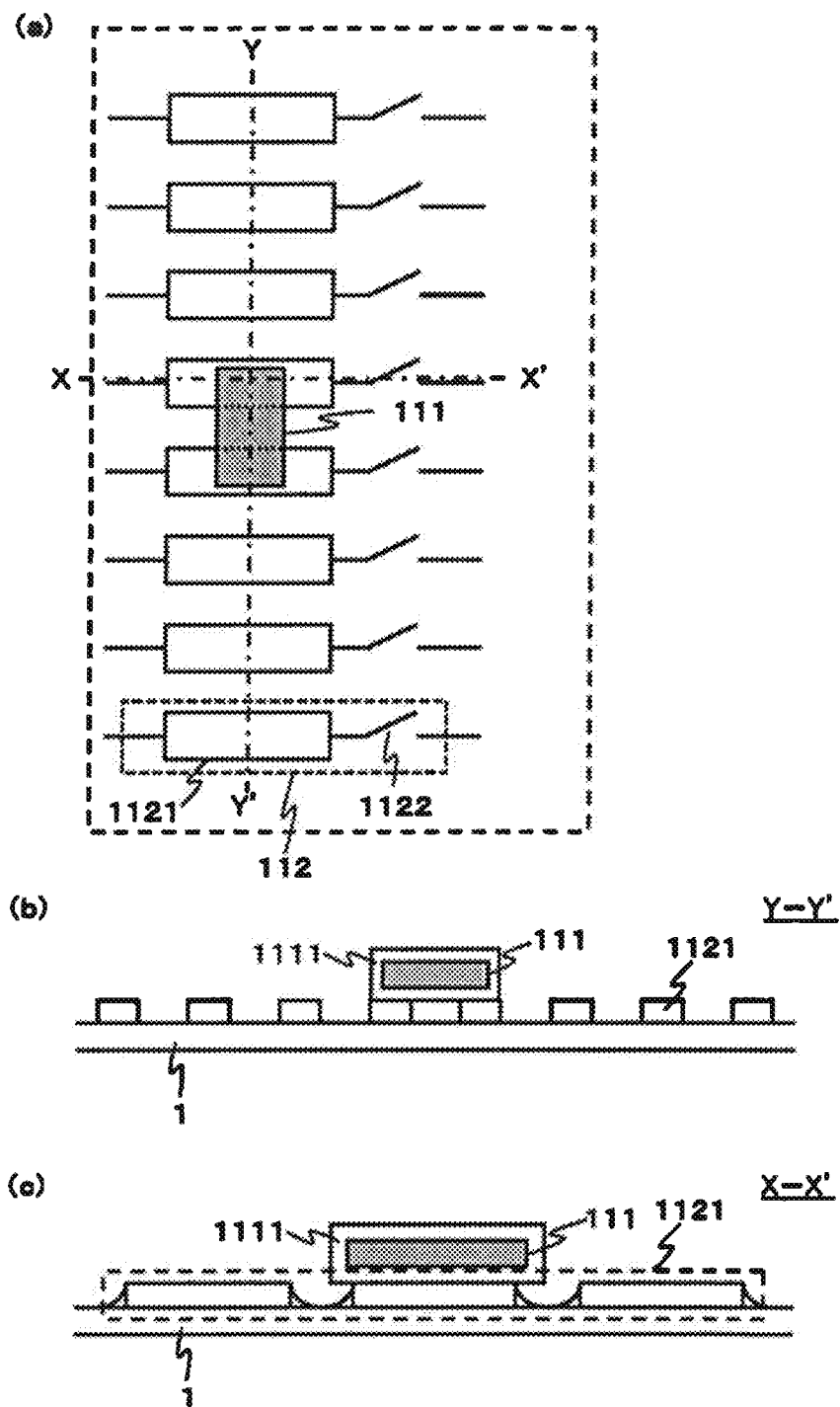
FIG. 7 is a diagram illustrating a third placement example of the first temperature sensor.

FIG. 7 is a diagram illustrating a third placement example of the first temperature sensor 111. FIGS. 7 (a), (b), and (c) respectively illustrate a top view, a sectional view in Y-Y' direction, and a sectional view in X-X' direction of the balance circuit board 1 in the third placement example. In the third placement example, the first temperature sensor 111 is provided on an upper face of the heat-generating element 1121 while being covered with an insulator 1111 that is a coating film and the like formed of an insulating material. Also with such a configuration, it becomes possible to provide the first temperature sensor 111 in such a way as to overlap the maximum heat-generating point that is predicted as described in FIGS. 2 and 3 or is specified by a test operation and the like.

Figure 8:
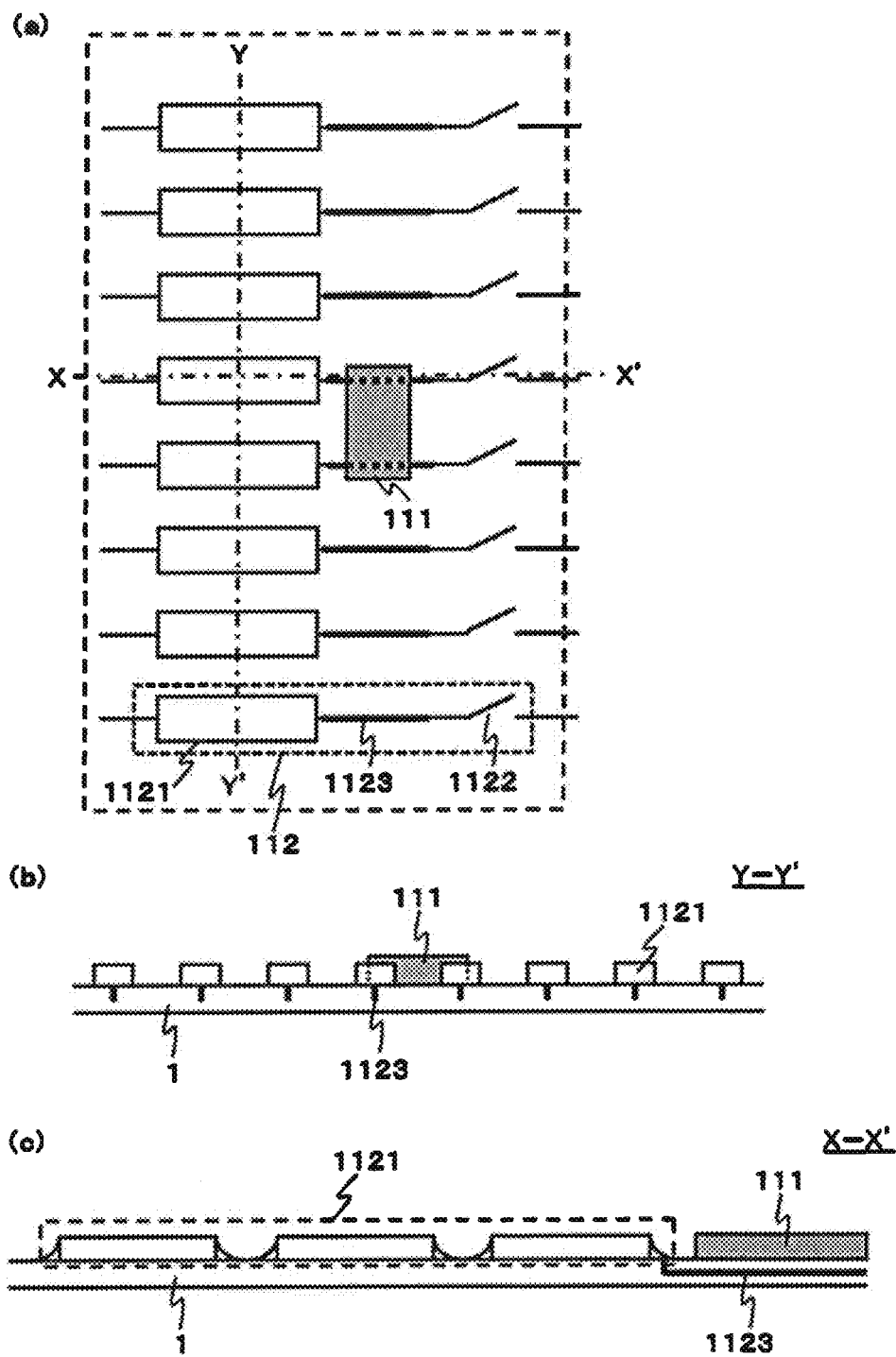
FIG. 8 is a diagram illustrating a fourth placement example of the first temperature sensor.

FIG. 8 is a diagram illustrating a fourth placement example of the first temperature sensor 111. FIGS. 8(a), (b), and (c) respectively illustrate a top view, a sectional view in Y-Y' direction, and a sectional view in X-X' direction of the balance circuit board 1 in the fourth placement example. In the fourth placement example, it is assumed that the balance circuit board 1 is a substrate having a multilayer structure. In such a balance circuit board 1, as illustrated in FIG. 8, a wiring line 1123 to be connected with the heat-generating element 1121 may be provided on an inner layer. In this case, the first temperature sensor 111 may be provided at a position overlapping the wiring line 1123 in a planar view. In FIG. 8, the wiring line 1123 is connected to an end part of three series-connected heat-generating elements 1121, and the first temperature sensor 111 is arranged in such a way as to overlap the wiring line 1123 in a planar view. The wiring line 1123 is a metal and has high thermal conductivity, which facilitates transfer of heat from the heat-generating element 1121. Thus, heat from the heat-generating element 1121 can be detected relatively accurately by providing the first temperature sensor 111 right above the wiring line 1123 in this way.

Figure 9:
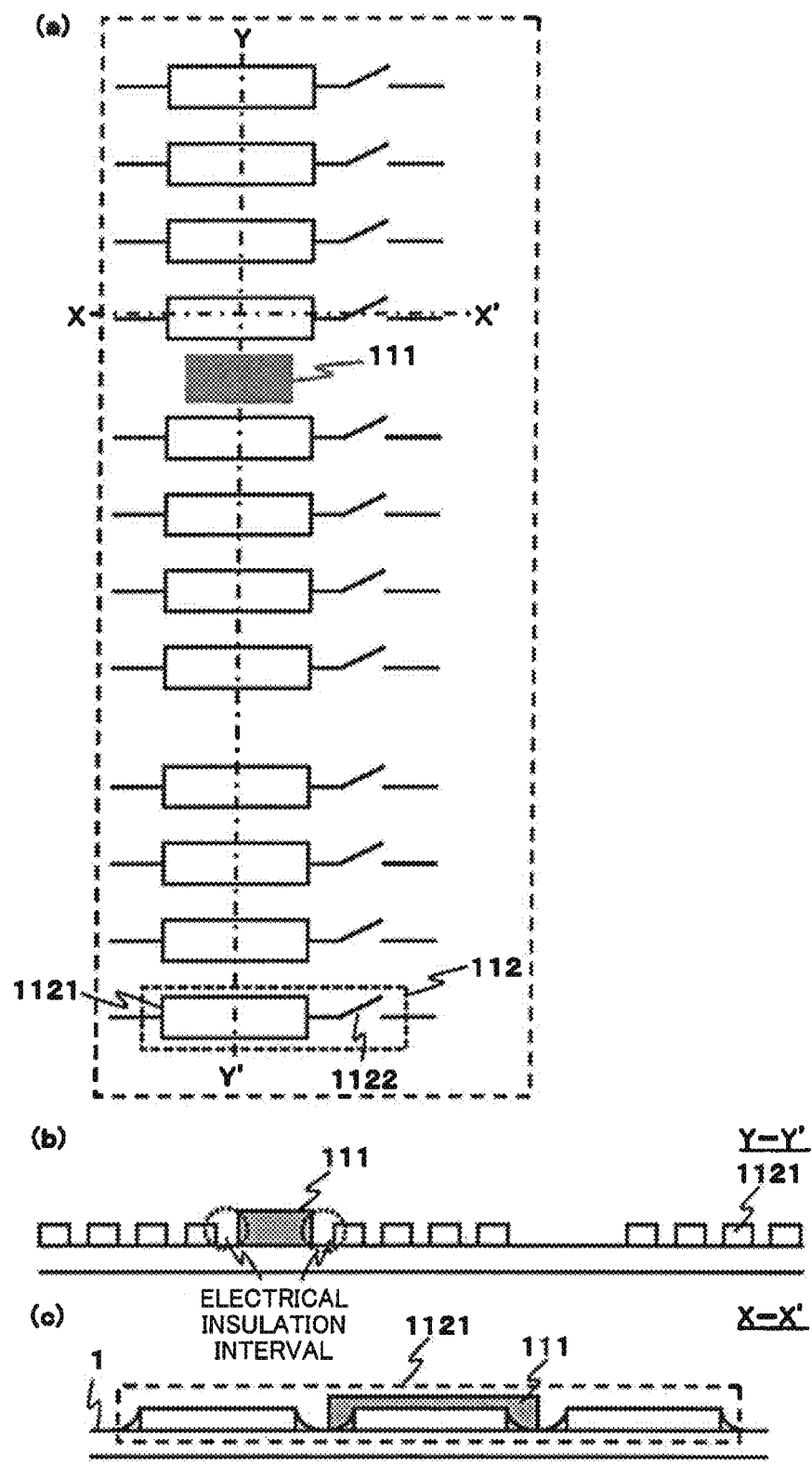
FIG. 9 is a diagram illustrating a fifth placement example of the first temperature sensor.

FIG. 9 is a diagram illustrating a fifth placement example of the first temperature sensor 111. In the fifth placement example, illustrated is a case where twelve balance circuits 112 are provided separately in three blocks, and there exist a plurality of spaces in which the first temperature sensor 111 can be arranged between the blocks in Y-Y' direction. In the present drawings, it is assumed that circuit components of the middle block are present at a center of a range sandwiched between the heat-generating elements 1121 at both ends, and there is no space for arranging the first temperature sensor 111. In this case, the first temperature sensor 111 can be arranged in at least either a space between the upper block and the middle block or a space between the middle block and the lower block. Note that FIG. 9 illustrates an example in which the first temperature sensor 111 is provided in the upper space. Although not illustrated, when five blocks are aligned, the first temperature sensor 111 is preferably provided in at least either a space between the second block and the third block or a space between the third block and the fourth block, since these spaces are closer to a center of a range sandwiched between the heat-generating elements 1121 at both ends. Without limitation thereto, the first temperature sensor 111 may be provided in a space between the uppermost block and the second block, or in a space between the fourth block and the lowermost block.

Note that an arrangement position of the first temperature sensor 111 is not limited to the examples illustrated in FIGS. 5 to 9. For example, a plurality of first temperature sensors 111 may be provided across the entire balance circuit board 1, within a range that is defined in consideration of heat generation distribution in Y-Y' direction and X-X' direction. In addition, for example, in FIGS. 6, 8, and 9, the first temperature sensor 111 may be provided on a rear face, as illustrated in FIG. 5.

In addition, the first temperature sensor 111 becomes less responsive to heat generated from a corresponding balance circuit 112 as the first temperature sensor 111 is more distant from the balance circuit 112. Thus, in terms of temperature measurement accuracy, the first temperature sensor 111 is more preferably provided at a position that is closer to the corresponding balance circuit 112. The first temperature sensor 111 can be mounted near a surface of the balance circuit board 1 by using a thermistor resistor, a semiconductor temperature sensor, a resistance temperature detector (RTD), and the like as the first temperature sensor 111. Accordingly, it becomes possible to arrange the first temperature sensor 111 in proximity to the balance circuit 112 in a direction perpendicular to a face of the balance circuit board 1, and measure a temperature of the balance circuit 112 with high accuracy.

The control unit 121 controls a balance operation of the balance circuit 112 corresponding to each of the battery cells 311, based on a voltage of each of the battery cells 311 and a temperature (hereinafter, also written as a first measured temperature) measured by the first temperature sensor 111.

A basic control of the balance circuit 112 performed by the control unit 121 will be described. The control unit 121 acquires a voltage of each of the battery cells 311 via a terminal (not illustrated) of the connector 2 connected to each of the battery cells 311, and specifies a battery cell 311 having a lowest voltage (hereinafter, a lowest voltage cell) among the plurality of battery cells 311. Then, the control unit 121 calculates, for each of the battery cells 311 other than the lowest voltage cell, a voltage difference ΔVB from the lowest voltage cell. Then, the control unit 121 actuates the balance circuit 112 corresponding to the battery cell 311 whose voltage difference ΔVB from the lowest voltage cell is equal to or more than a voltage difference that is a balance operation start condition (hereinafter, this voltage difference will be written as "$\Delta VB_{on}$"). The voltage difference ΔVB between the battery cell 311 corresponding to the balance circuit 112 and the lowest voltage cell is reduced by actuating the balance circuit 112. Then, when the voltage difference ΔVB between the battery cell 311 and the lowest voltage cell becomes equal to or less than a voltage difference that is a balance operation end condition (hereinafter, this voltage difference will be written as "$\Delta VB_{off}$"), the control unit 121 stops a balance operation of the balance circuit 112 corresponding to the battery cell 311.

Herein, the balance circuit 112 generates heat through a balance operation. For example, a balance circuit of the passive balance type includes a resistive element, and during execution of a balance operation, discharge energy of the battery cell 311 is consumed by the resistive element and the resistive element generates heat accordingly. This heat generation of the resistive element may cause a temperature of the balance circuit 112 to be higher than that of the battery cell 311. For example, when a power storage device is used, a temperature of the battery cell 311 is about 40° C. even after rising, whereas a temperature of the balance circuit may rise up to approximately 85° C. through a balance operation. Then, this heat transfers to the battery cell 311 and other components within the power storage device via a medium such as the balance circuit board 1 and thereby causes temperature rise. This may adversely affect service life, operation reliability, and the like of the battery cell 311 and the other components.

In view of the above, when a temperature measured by the first temperature sensor 111 provided for the balance circuit 112 (hereinafter, also written as a first measured temperature) is equal to or more than an upper reference temperature, the control unit 121 stops an operation of the balance circuit 112 corresponding to the first temperature sensor 111, regardless of the voltage difference ΔVB of the battery cell 311 relative to the lowest voltage cell described above. When the balance circuit 112 corresponding to the first temperature sensor 111 is stopped because the first measured temperature measured by the first temperature sensor 111 becomes the upper reference temperature, heat generation of the balance circuit 112 calms down and the first measured temperature begins to decrease. Then, when the first measured temperature measured by the first temperature sensor 111 becomes equal to or less than a lower reference temperature that is lower than the upper reference temperature, the control unit 121 restarts the operation of the balance circuit 112 corresponding to the first temperature sensor 111. The control unit 121 holds, for example, information indicating a correspondence relationship between the first temperature sensor 111 and the balance circuit 112 in a not-illustrated storage region in advance. When there is the first temperature sensor 111 measuring a temperature equal to or more than the upper reference temperature, by using the information in the storage region, the control unit 121 identifies the balance circuit 112 of which a balance operation is to be stopped. In addition, by using the information in the storage region, the control unit 121 identifies the balance circuit 112 of which a balance operation is to be restarted, when there is the first temperature sensor 111 measuring a temperature equal to or more than the upper reference temperature and subsequently the temperature drops to measure a temperature equal to or less than the lower reference temperature.

The upper reference temperature is a threshold temperature at which an operation of the balance circuit 112 is to be stopped. When the upper reference temperature is set lower, heat generation of the balance circuit can be suppressed and the battery cell 311 and the components can be protected with higher accuracy. Meanwhile, the balance circuit 112 is more frequently stopped, and it may take a longer time for voltages of the battery cells 311 to be equalized. The lower reference temperature is a threshold temperature at which an operation of the balance circuit 112 is to be restarted. When the lower reference temperature is set lower, a temperature of the balance circuit 112 decreases sufficiently and the battery cell 311 and the components can be protected with higher accuracy. Meanwhile, a time for a balance operation to be restarted is prolonged, and it takes a longer time for voltages of the battery cells 311 to be equalized. The upper reference temperature and the lower reference temperature are respectively adjusted to appropriate values, based on uses, performance requirements, and the like of a power storage device, for example, and are set in a not-illustrated storage region such as a memory of the control unit 121. For example, the upper reference temperature and the lower reference temperature are set as 85° C. and 80° C., respectively, in the storage region of the control unit 121. When a difference (temperature hysteresis) between the upper reference temperature and the lower reference temperature is 5° C. or more, a balance operation of each balance circuit 112 can be stably controlled. In addition, when a difference between the upper reference temperature and the lower reference temperature is, for example, 10° C. or less, it is possible to reduce an adverse effect caused by heat generation of the balance circuit 112 and the plurality of battery cells 311 can be balanced without taking a longer time. However, a range of the difference is not limited to the range exemplified herein.

When an operation stop time of the balance circuit 112 due to the first measured temperature becoming equal to or more than the upper reference temperature exceeds a reference value per unit time, or when an operation stop number-of-times of the balance circuit 112 due to the first measured temperature becoming equal to or more than the upper reference temperature exceeds a reference number-of-times per unit time, the communication unit 122 outputs, to outside, information capable of specifying the balance circuit or a battery cell corresponding to the balance circuit.

Specifically, the control unit 121 holds, in a not-illustrated storage region, an operation stop time of the balance circuit 112 due to the first measured temperature becoming equal to or more than the upper reference temperature, or an operation stop number-of-times of the balance circuit 112 due to the first measured temperature becoming equal to or more than the upper reference temperature. Then, the control unit 121 calculates, by using the held information, the operation stop time of the balance circuit 112 per unit time or the operation stop number-of-times of the balance circuit 112 per unit time. Then, the control unit 121 determines whether or not there is the balance circuit 112 of which the calculated operation stop time is equal to or more than a preset reference value per unit time, or whether or not there is the balance circuit 112 of which the calculated operation stop number-of-times is equal to or more than a preset reference number-of-times per unit time. For example, the control unit 121 determines whether or not the operation stop time per unit time of the balance circuit 112 occupies half or more of the unit time, or whether or not the balance circuit 112 has stopped operating for a fixed number of times or more per unit time. When the operation stop time per unit time is longer than predetermined reference value, or when the operation stop number-of-times per unit time is large, there is a possibility of occurrence of an abnormality, such as abnormal heat generation of the balance circuit 112 and failure of the first temperature sensor 111. In view of this, when there is the balance circuit 112 of which the operation stop time exceeds a predetermined reference value or of which the operation stop number-of-times exceeds a predetermined reference number-of-times, the control unit 121 generates information capable of specifying the balance circuit or the battery cell 311 corresponding to the balance circuit 112, and causes the communication unit 122 to output the information.

Circuit Configuration Example 1

Figure 10:
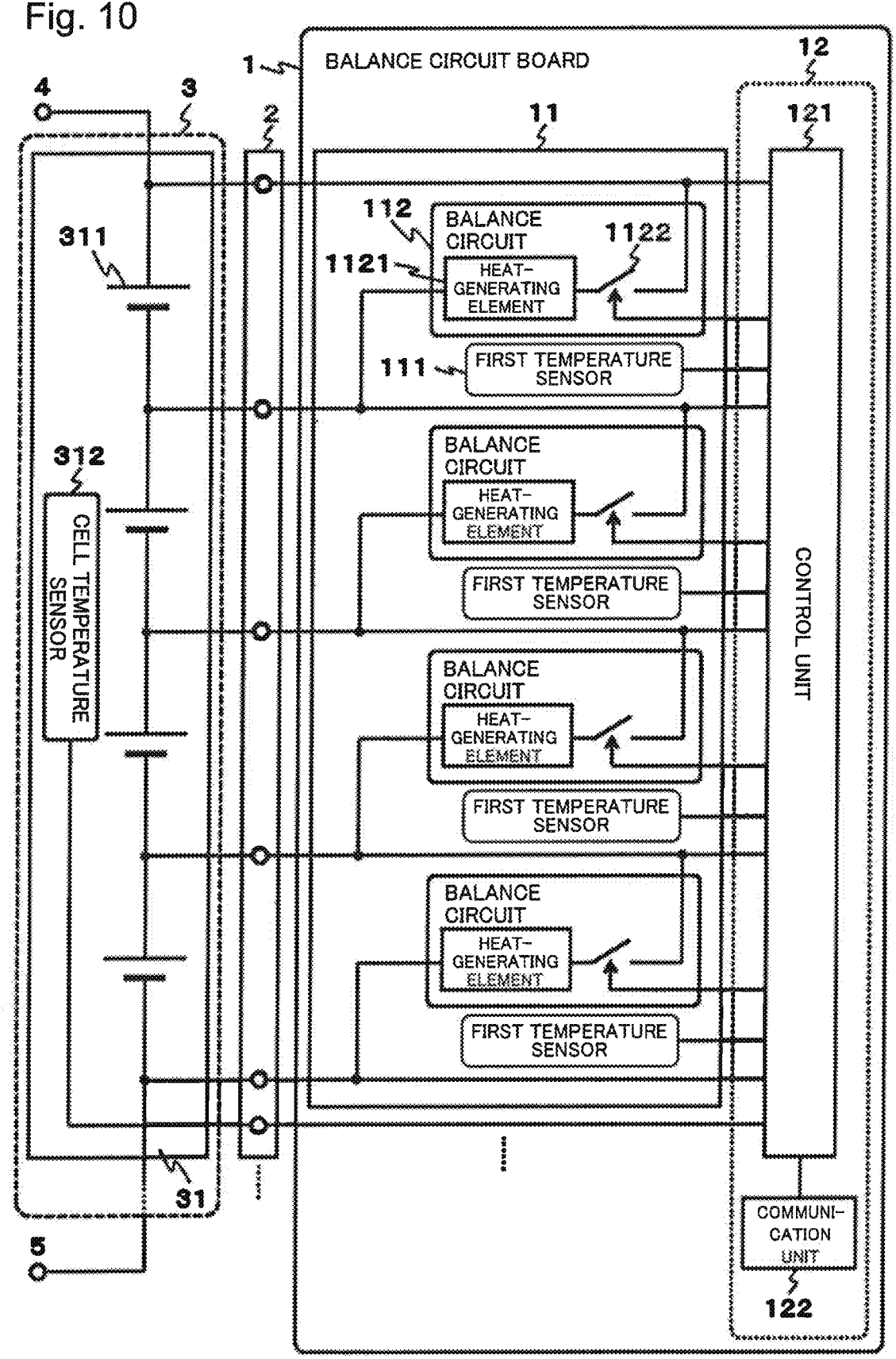
FIG. 10 is a diagram schematically illustrating a circuit configuration example of the power storage device according to the first example embodiment.

A configuration of the power storage device according to the present example embodiment will be described by using FIG. 10. FIG. 10 is a diagram schematically illustrating a circuit configuration example of the power storage device according to the first example embodiment. In the present figure, an example in which one first temperature sensor 111 is provided for one balance circuit 112 is illustrated.

As illustrated in FIG. 10, each of the battery cells 311 included in the battery module 31 is connected with a corresponding balance circuit 112 through a terminal of the connector 2. The balance circuit 112 is provided in the balance circuit block 11 of the balance circuit board 1, and includes the heat-generating element 1121 and the switch element 1122. In the case of a passive balance type, the heat-generating element 1121 is a resistive element that consumes discharge energy of the battery cell 311 corresponding to each of the balance circuits 112. Further, the switch element 1122 is a switching transistor, a metal oxide semiconductor field effect transistor (MOS-FET), and the like, for example.

The control unit 121 is connected with each of the switch elements 1122 through a control line. The control unit 121 transmits a control signal to each of the switch elements 1122 through the control line, and switches ON/OFF states of each switch element 1122. When the switch element 1122 is switched to an ON state by the control unit 121, the battery cell 311 and the balance circuit 112 corresponding to the battery cell 311 forms a closed loop, and a balance operation is executed. On the other hand, when the switch element 1122 is switched to an OFF state by the control unit 121, the closed loop formed by the battery cell 311 and the balance circuit 112 corresponding to the battery cell 311 is released, and the balance operation is stopped.

The control unit 121 controls ON/OFF states of the switch element 1122 of each of the balance circuits 112, based on a voltage difference between the plurality of battery cells 311 and a temperature detected by each of the first temperature sensors 111.

The control unit 121 is connected to terminals of the connector 2, and acquires a voltage of each of the battery cells 311 from a voltage between the terminals. The control unit 121 compares the acquired voltages of the battery cells 311, and specifies a lowest voltage cell. Then, the control unit 121 calculates a voltage difference $\Delta VB$ from the lowest voltage cell for each of the battery cells 311 other than the lowest voltage cell. Herein, when the voltage difference $\Delta VB$ between the lowest voltage cell and a certain battery cell 311 is $\Delta VB_{on}$, the control unit 121 transmits a control signal for switching the switch element 1122 corresponding to the battery cell 311 to an ON state. Accordingly, a balance operation by the balance circuit 112 is executed. On the other hand, when the voltage difference $\Delta VB$ between the lowest voltage cell and the certain battery cell 311 becomes equal to or less than $\Delta VB_{off}$ by executing the balance operation, the control unit 121 transmits a control signal for switching the switch element 1122 corresponding to the battery cell 311 to an OFF state. Accordingly, the balance operation by the balance circuit 112 is stopped. A voltage difference between the battery cell 311 and the lowest voltage cell is reduced as the heat-generating element 1121 consumes discharge energy of the battery cell 311 whose voltage difference $\Delta VB$ from the lowest voltage cell is equal to or more than $\Delta VB_{on}$. A voltage of each of the plurality of battery cells 311 becomes close to a voltage of the lowest voltage cell by performing a balance operation for each of the plurality of battery cells 311 whose voltage difference $\Delta VB$ from the lowest voltage cell is equal to or more than $\Delta VB_{on}$. As a result, voltages of the plurality of battery cells 311 are equalized.

In addition, the control unit 121 is connected with each of the first temperature sensors 111 through a signal line. The control unit 121 acquires an output voltage from each of the first temperature sensors 111 and converts the output voltage into a temperature (a first measured temperature). When the heat-generating element 1121 generates heat through a balance operation and the first measured temperature becomes equal to or more than an upper reference temperature, the control unit 121 transmits a control signal for setting the switch element 1122 of the balance circuit 112 corresponding to the first temperature sensor 111 to an OFF state, regardless of the voltage difference $\Delta VB$. Accordingly, a balance operation of the balance circuit 112 corresponding to the first temperature sensor 111 measuring a temperature equal to or more than the upper reference temperature is stopped. When heat generation of the heat-generating element 1121 calms down and the first measured temperature becomes equal to or less than a lower reference temperature, the control unit 121 transmits a control signal for setting the switch element 1122 to an ON state, and restarts the balance operation by the balance circuit 112.

In addition, the control unit 121 holds, in a not-illustrated storage region, a time for which each balance circuit 112 stops operating, or the number of times each balance circuit 112 stops operating. Then, the control unit 121 calculates an operation stop time or an operation stop number-of-times per unit time of each balance circuit 112 by using information held in the storage region. Then, the control unit 121 determines whether or not there is the balance circuit 112 of which the calculated operation stop time per unit time is equal to or more than a predetermined reference value, or the balance circuit 112 of which the calculated operation stop number-of-times per unit time is equal to or more than a predetermined reference number-of-times. When there is the balance circuit 112 concerned, the control unit 121 generates information capable of specifying the balance circuit 112 or the battery cell 311 corresponding to the balance circuit 112, and outputs the information to a communicably connected external monitoring device and the like, for example, via the communication unit 122. Accordingly, the external monitoring device can display the information transmitted from the communication unit 122 on a display, and an operator of the external monitoring device is able to specify the balance circuit 112 or the battery cell 311 that seems to have an abnormality of some kind.

The control unit 121 includes, for example, a not-illustrated storage region such as a read only memory (ROM) and a random access memory (RAM), and stores programs for implementing the above-described functions in the storage region. In addition, the control unit 121 includes a not-illustrated central processing unit (CPU), and implements the above-described functions by executing the programs stored in the storage region by use of the CPU.

Further, the control unit 121 may be configured to execute a balance operation by monitoring a voltage difference between the plurality of battery cells 311 all the times, or may be configured to execute a balance operation only when charging.

Although not illustrated in FIG. 10, the plurality of battery modules 31 are connected in series between an external positive electrode terminal 4 and an external negative electrode terminal 5 of the power storage device. The power storage device is connected to a not-illustrated external device and a not-illustrated external power supply through the external positive electrode terminal 4 and the external negative electrode terminal 5, and performs discharging or charging.

An example of a balance operation in the power storage device in FIG. 10 will be described by using FIG. 11.

Note that, in the following description, when a certain channel has a voltage difference $\Delta VB$ of equal to or more than $\Delta VB_{on}$, the control unit 121 executes a balance operation at a predetermined balance frequency FBAL. The balance frequency FBAL includes an ON period $T_{on}$ during which the switch element 1122 is in an ON state, and an OFF period $T_{off}$ during which the switch element 1122 is in an OFF state. The ON period $T_{on}$ and the OFF period $T_{off}$ are alternately repeated. The control unit 121 can manage a lapse of these periods by using a timer, for example.

Figure 11:
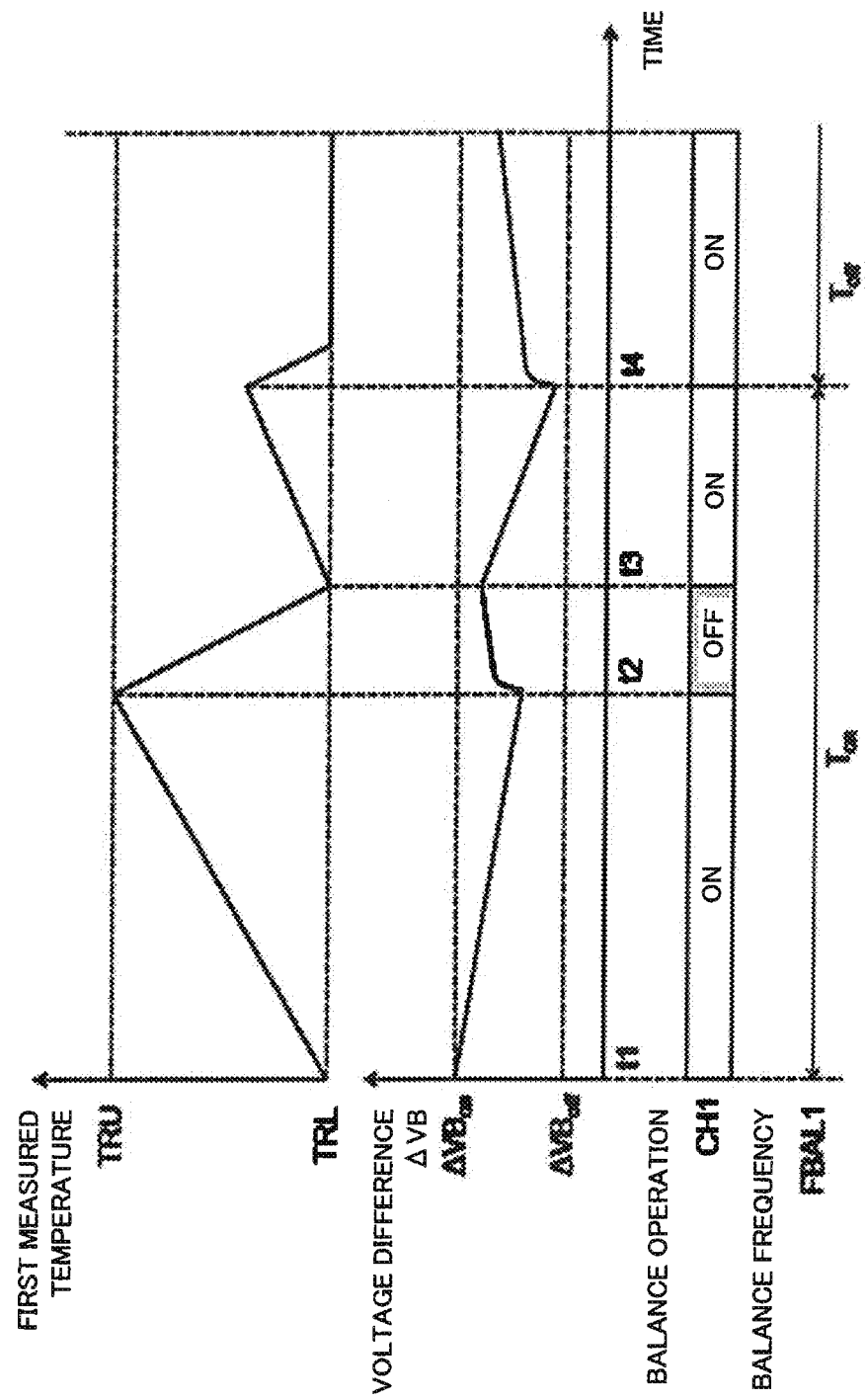
FIG. 11 is a diagram exemplifying a specific flow of a balance operation of each channel in the power storage device in FIG. 10.

FIG. 11 is a diagram exemplifying a specific flow of a balance operation of each channel in the power storage device in FIG. 10.

First, a voltage difference $\Delta VB$ of CH1 reaches $\Delta VB_{on}$ at time t1. Then, the control unit 121 sets the switch element 1122 of CH1 to an ON state, and starts a balance operation of CH1. Accordingly, the voltage difference $\Delta VB$ of CH1 begins to decrease. In addition, a first measured temperature begins to rise due to heat generated from the heat-generating element 1121 of CH1. Note that FIG. 11 illustrates a behavior of the linearly rising first measured temperature, but in fact, the first measured temperature may exhibit various behaviors upon receiving influence such as operation states of surrounding channels.

Thereafter, the first measured temperature continues to rise, and the first measured temperature reaches an upper reference temperature TRU at time t2. Then, the control unit 121 sets the switch element 1122 of CH1 corresponding to the first temperature sensor 111 to an OFF state, and stops the balance operation of CH1. Since the balance operation is stopped in CH1, heat generation of the heat-generating element 1121 of CH1 calms down, and the first measured temperature begins to decrease. Note that FIG. 11 illustrates a behavior of the linearly decreasing first measured temperature, but in fact, the first measured temperature may exhibit various behaviors upon receiving influence such as operation states of surrounding channels. In addition, when the balance operation of the balance circuit 112 is stopped, load impedance is increased and voltage rebound occurs. As illustrated in FIG. 11, a voltage of the battery cell 311 of CH1 exhibits an upward tendency because of this voltage rebound.

Thereafter, the first measured temperature drops down to a lower reference temperature TRL at time t3. Then, the control unit 121 determines whether a balance frequency FBAL of CH1 corresponding to the first temperature sensor 111 is an ON period $T_{on}$ or an OFF period $T_{off}$. The control unit 121 restarts the balance operation of CH1 in the case of the ON period $T_{on}$. In an example in FIG. 11, since CH1 is in the ON period $T_{on}$ at time t3, the control unit 121 sets the switch element 1122 of CH1 to an ON state, and the balance operation is restarted in CH1. Consequently, the voltage difference $\Delta VB$ of CH1 begins to decrease again, and the first measured temperature begins to rise again.

Thereafter, the predetermined ON period elapses at time t4. The control unit 121 sets the switch element 1122 of CH1 to an OFF state with timing at which time elapsed after the balance operation turned into the ON state reaches $T_{on}$, and stops the balance operation. Herein, although not illustrated, the control unit 121 completes the balance operation of CH1 when the voltage difference $\Delta VB$ becomes equal to or less than $\Delta VB_{off}$ during the ON period $T_{on}$.

In addition, although not illustrated, the control unit 121 completes the balance operation of CH1 when the voltage difference $\Delta VB$ after occurrence of voltage rebound is equal to or less than a predetermined threshold value (an intermediate value between $\Delta VB_{on}$ and $\Delta VB_{off}$, for example) at a time of entering a next ON period $T_{on}$ after a lapse of the OFF period $T_{off}$. Note that in this case, a threshold value for completing the balance operation is set to a desirable value according to a use environment and the like of the power storage device. When the voltage difference $\Delta VB$ is more than the predetermined threshold value, the control unit 121 continues the balance operation of the channel in a next cycle.

Figure 12:
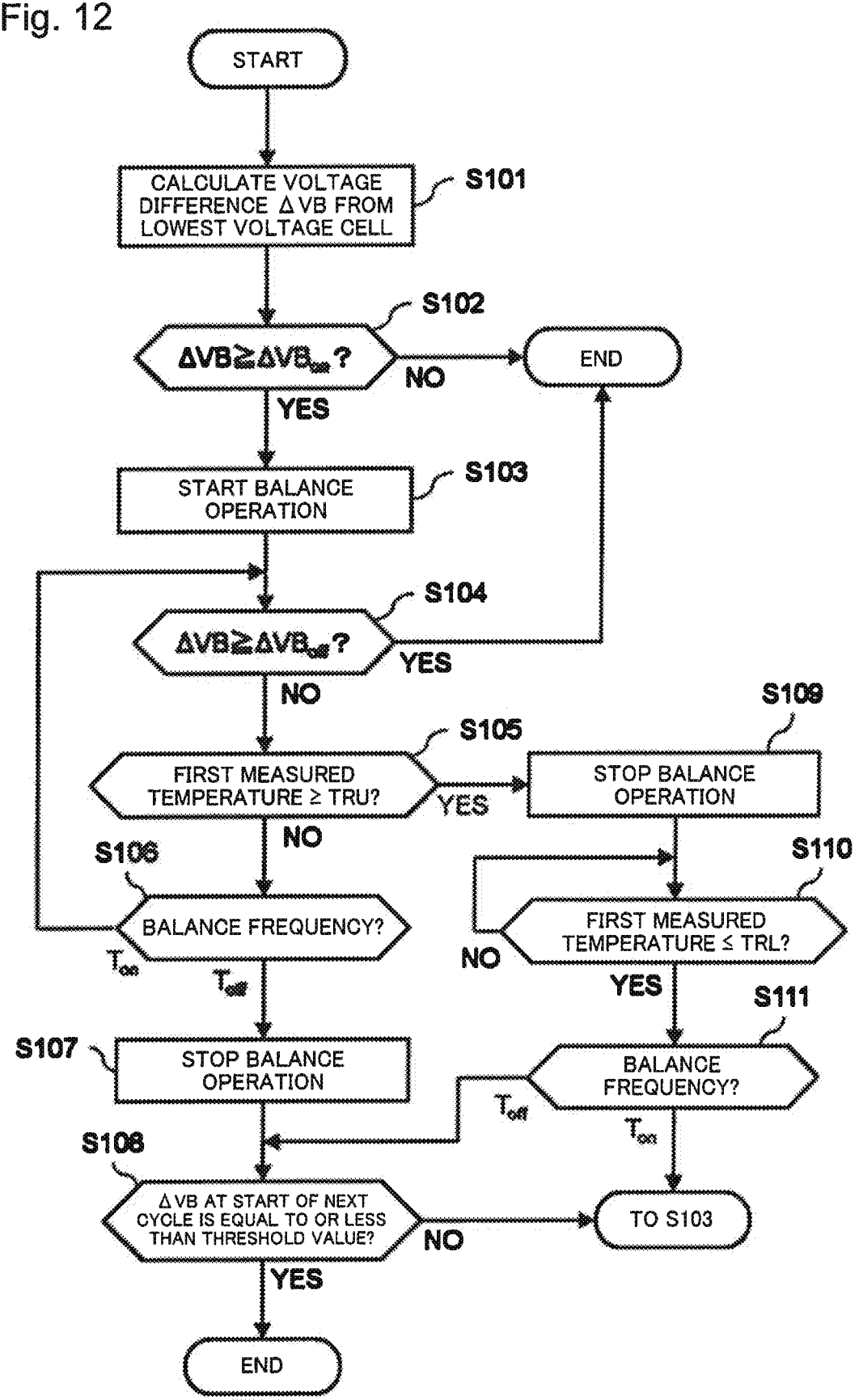
FIG. 12 is a flowchart illustrating a flow of processing of the balance operation in FIG. 11.

FIG. 12 is a flowchart illustrating a flow of processing of the balance operation in FIG. 11.

The control unit 121 specifies, based on a voltage between the terminals of the connector 2, a lowest voltage cell from among the plurality of battery cells 311, and calculates a voltage difference $\Delta VB$ between the lowest voltage cell and each of the other battery cells 311 (S101). Then, the control unit 121 determines, for each of the battery cells 311, whether or not the voltage difference $\Delta VB$ between the battery cell 311, and the lowest voltage cell is equal to or more than $\Delta VB_{on}$ that is a balance operation start condition (S102). When the voltage difference B VB from the lowest voltage cell is less than $\Delta VB_{on}$ (S102: NO), it is not necessary to execute a balance operation in a channel of the battery cell 311. Thus, the control unit 121 does not actuate the balance circuit 112 and ends the processing. On the other hand, when the voltage difference $\Delta VB$ from the lowest voltage cell is equal to or more than $\Delta VB_{on}$ (S102: YES), the control unit 121 starts a balance operation of a channel of the battery cell 311 (S103).

The control unit 121 determines, for the channel performing the balance operation, whether or not the voltage difference $\Delta VB$ from the lowest voltage cell becomes equal to or less than $\Delta VB_{off}$ that is one of balance operation completion conditions (S104). When the voltage difference $\Delta VB$ from the lowest voltage cell becomes equal to or less than $\Delta VB_{off}$ through the balance operation (S104: YES), the control unit 121 completes the balance operation of the channel.

On the other hand, when the voltage difference $\Delta VB$ from the lowest voltage cell is not equal to or less than $\Delta VB_{off}$ (S104: YES), the control unit 121 determines whether or not a first measured temperature acquired from the corresponding first temperature sensor 111 of the channel is equal to or more than an upper reference temperature TRU (S105).

When the first measured temperature is less than the upper reference temperature TRU (S105: NO), the control unit 121 determines whether a balance frequency FBAL of the channel is an ON period $T_{on}$ or an OFF period $T_{off}$ (S106). When the balance frequency FBAL is the ON period $T_{on}$ (S106: $T_{on}$), the above-described processing from S104 is repeated. On the other hand, when the balance frequency FBAL is the OFF period $T_{off}$ (S106: $T_{off}$), the control unit 121 sets the switch element 1122 of the channel to an OFF state, and stops the balance operation (S107). Then, after waiting until the OFF period $T_{off}$ elapses, the control unit 121 determines whether or not the voltage difference ΔVB when a next cycle starts (at a time when a next ON period $T_{on}$ starts) is equal to or less than a predetermined threshold value (an intermediate value between $ΔVB_{on}$ and $ΔVB_{off}$, for example) (S108). Herein, when the voltage difference ΔVB is equal to or less than the threshold value (S108: YES), the control unit 121 completes the balance operation of the channel. On the other hand, when the voltage difference ΔVB is more than the threshold value (S108: NO), a balance operation of the next cycle is started (S103).

On the other hand, when the first measured temperature is equal to or more than the upper reference temperature TRU (S105: YES), the control unit 121 stops the balance operation of the channel (S109). Then, the control unit 121 holds a state in which the balance operation of the channel is stopped until the first measured temperature becomes equal to or less than a lower reference temperature TRL (S110: NO). When the first measured temperature becomes equal to or less than the lower reference temperature TRL (S110: YES), the control unit 121 determines whether a balance frequency FBAL of the channel is an ON period $T_{on}$ or an OFF period $T_{off}$ (S111). When the balance frequency FBAL is the ON period $T_{on}$ (S111: $T_{on}$), the control unit 121 restarts the balance operation of the channel (S103). On the other hand, when the balance frequency FBAL is the OFF period $T_{off}$ (S111: $T_{off}$), the control unit 121 determines whether or not the voltage difference ΔVB when a next cycle starts (at a time when a next ON period $T_{on}$ starts) is equal to or less than a predetermined threshold value (for example, an intermediate value between $ΔVB_{on}$ and $ΔVB_{off}$, and the like) (S108). Herein, when the voltage difference ΔVB is equal to or less than the threshold value (S108: YES), the control unit 121 completes the balance operation of the channel. On the other hand, when the voltage difference ΔVB is more than the threshold value (S108: NO), a balance operation of the next cycle is started (S103).

Figure 13:
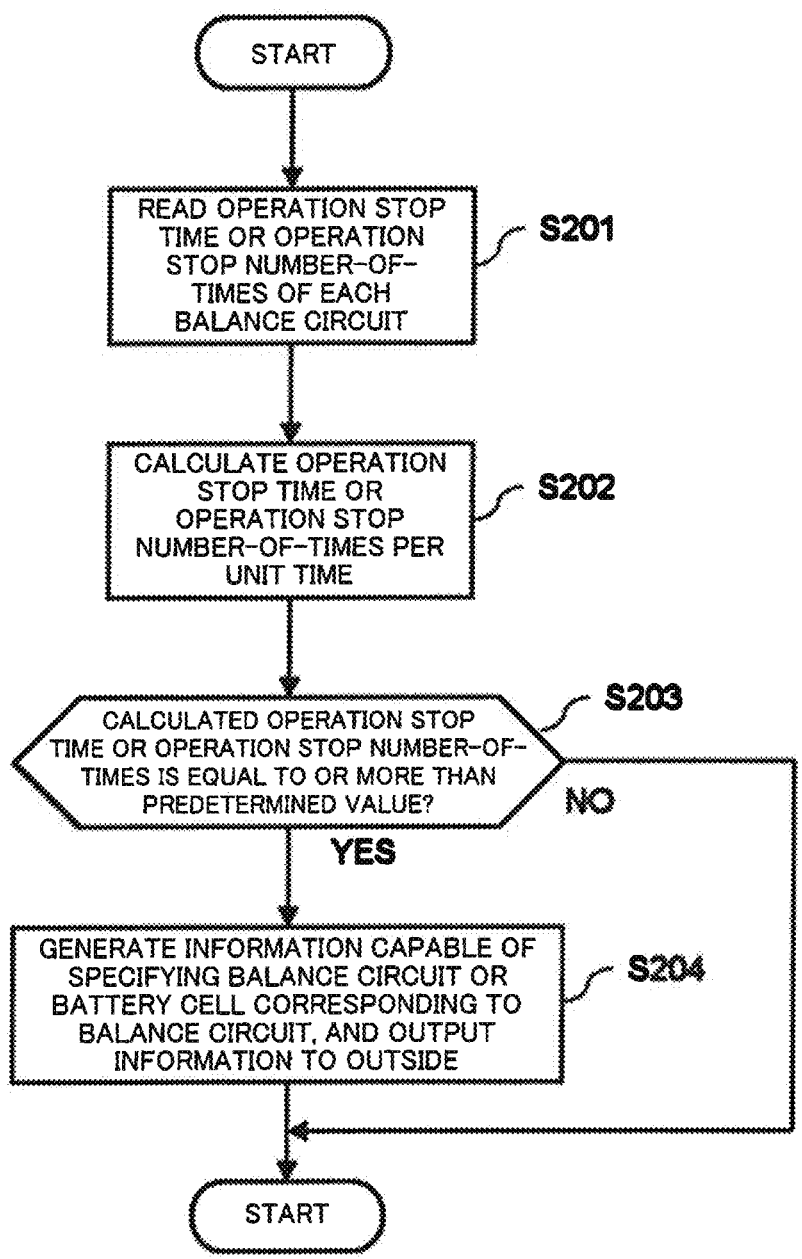
FIG. 13 is a flowchart illustrating a flow of processing of a control unit transmitting a signal for notifying an abnormality from a communication unit.

An operation of the control unit 121 transmitting a signal for notifying an abnormality from the communication unit 122 will be described by using FIG. 13. FIG. 13 is a flowchart illustrating a flow of processing of the control unit 121 transmitting a signal for notifying an abnormality from the communication unit 122.

The control unit 121 reads out an operation stop time or an operation stop number-of-times of each of the balance circuits 112 held in a storage region (S201). Then, the control unit 121 calculates, for each of the balance circuits 112, an operation stop time or an operation stop number-of-times per unit time (S202). Then, the control unit 121 determines whether or not the calculated operation stop time is equal to or more than a predetermined reference value, or whether or not the calculated operation stop number-of-times is equal to or more than a predetermined reference number-of-times (S203). When there is the balance circuit 112 concerned as a result of determination in S203 (S203: YES), the control unit 121 generates information capable of specifying the balance circuit 112 or the battery cell 311 corresponding to the balance circuit 112, and causes the communication unit 122 to transmit the information toward an external monitoring device and the like (S204).

Circuit Configuration Example 2

Figure 14:
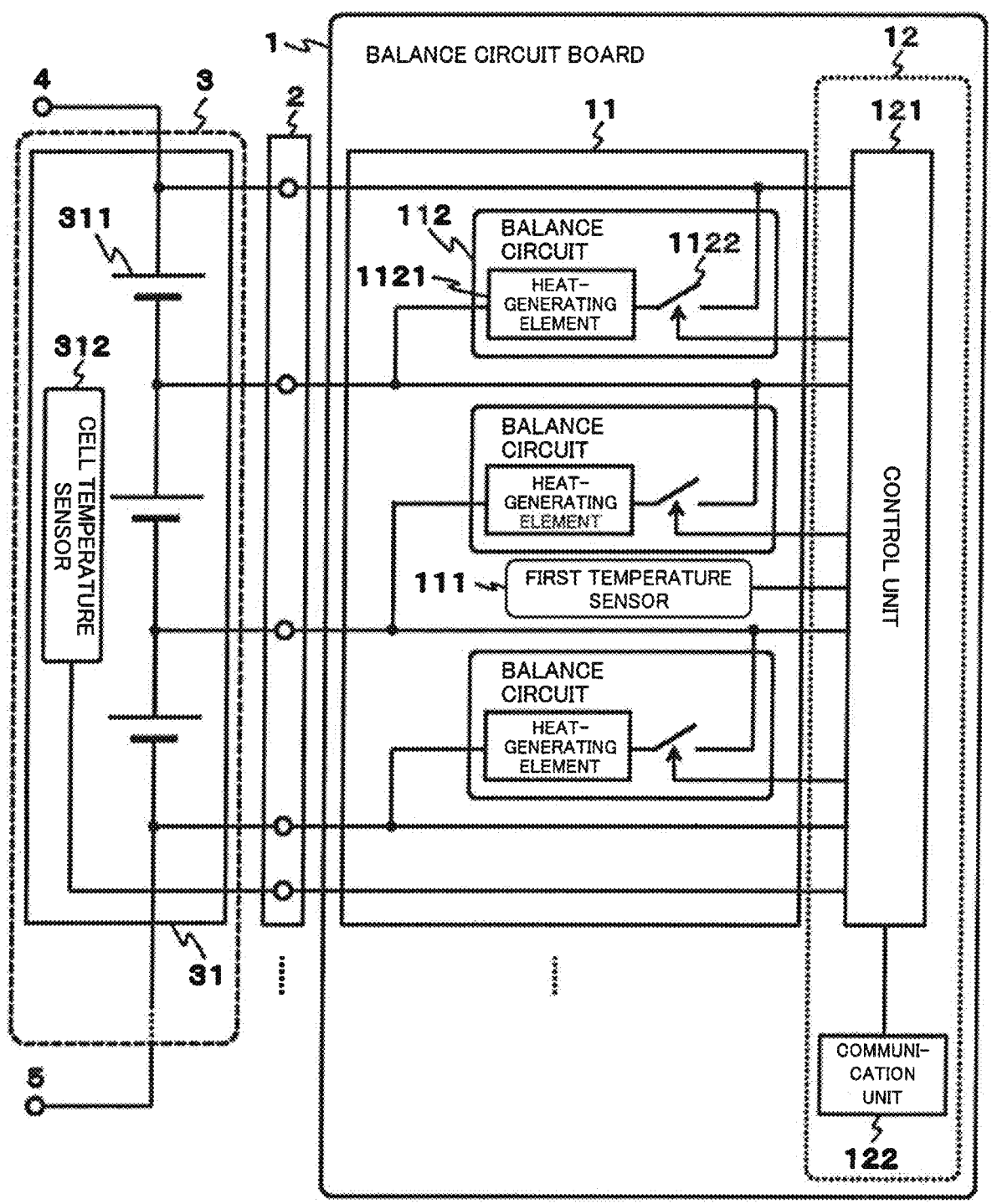
FIG. 14 is a diagram schematically illustrating another circuit configuration example of the power storage device according to the first example embodiment.

FIG. 14 is a diagram schematically illustrating another circuit configuration example of the power storage device according to the first example embodiment. As illustrated in FIG. 14, the first temperature sensor 111 may be provided for the plurality of balance circuits 112. In an example of the present figure, one first temperature sensor 111 is provided for every one battery module 31 (for every three balance circuits 112). Other configurations are similar to those in FIG. 10.

An example of a balance operation in the power storage device in FIG. 14 will be described by using FIG. 15.

Figure 15:
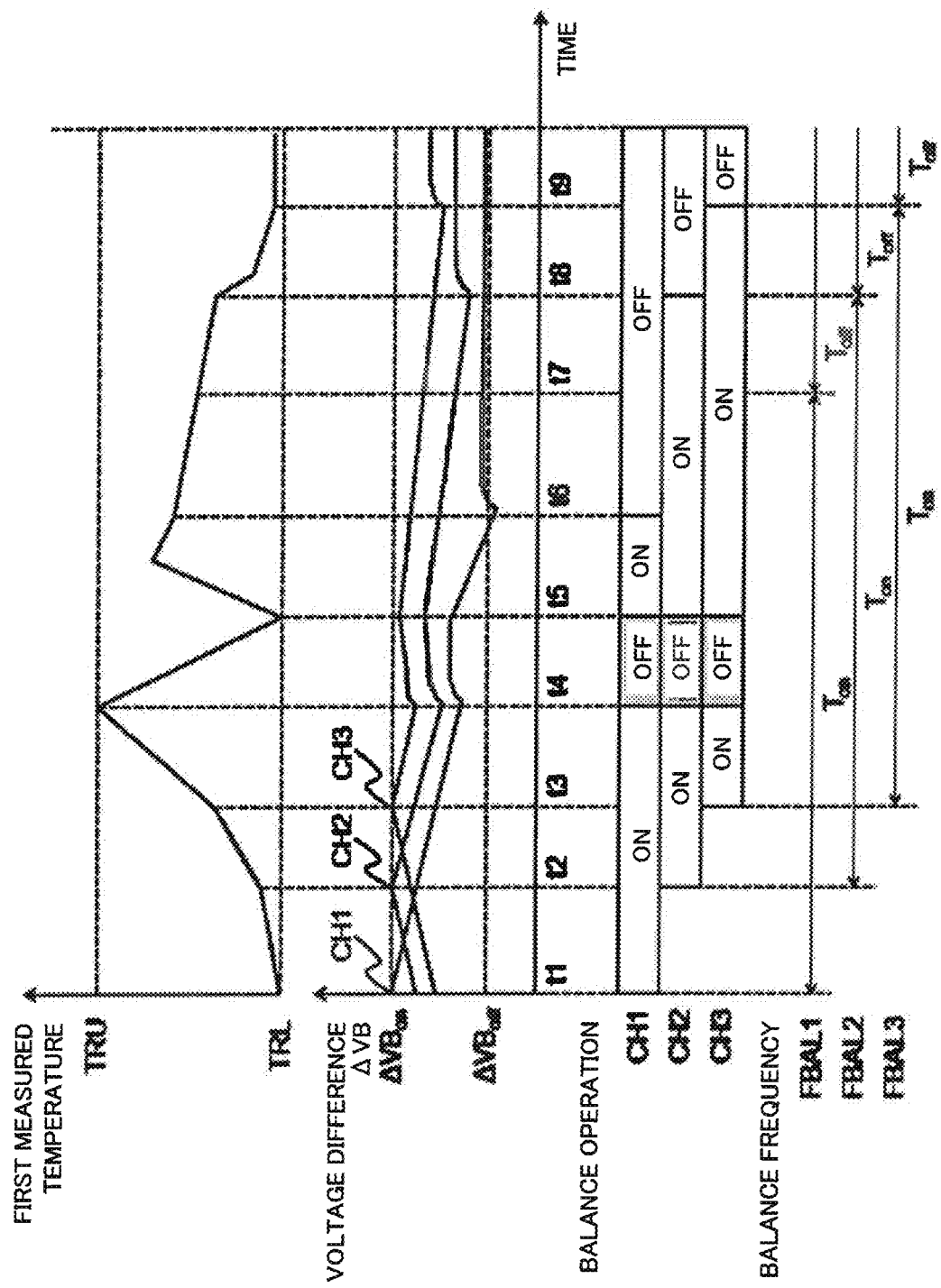
FIG. 15 is a diagram exemplifying a specific flow of a balance operation of each channel in the power storage device in FIG. 14.

FIG. 15 is a diagram exemplifying a specific flow of a balance operation of each channel in the power storage device in FIG. 14. Note that an example in FIG. 15 exemplifies an operation when a lowest voltage cell is present in another battery module 31 that is not illustrated in FIG. 14.

First, a voltage difference ΔVB between the battery cell 311 of CH1 and the lowest voltage cell reaches $ΔVB_{on}$ at time t1. Then, the control unit 121 sets the switch element 1122 of CH1 to an ON state, and starts a balance operation of CH1. Accordingly, the voltage difference ΔVB of CH1 begins to decrease. In addition, a first measured temperature begins to rise due to heat generated from the heat-generating element 1121 of CH1.

Thereafter, a voltage difference ΔVB between the battery cell 311 of CH2 and the lowest voltage cell reaches $ΔVB_{on}$ at time t2. Then, the control unit 121 sets the switch element 1122 of CH2 to an ON state, and starts a balance operation of CH2. Accordingly, the voltage difference ΔVB of CH2 begins to decrease. In addition, a rise value per unit time of the first measured temperature increases from time t2, due to heat generated from the heat-generating elements 1121 of CH1 and CH2.

Thereafter, a voltage difference ΔVB between the battery cell 311 of CH3 and the lowest voltage cell reaches $ΔVB_{on}$ at time t3. Then, the control unit 121 sets the switch element 1122 of CH3 to an ON state, and starts a balance operation of CH3. Accordingly, the voltage difference ΔVB of CH3 begins to decrease. In addition, a rate of rise of the first measured temperature further increases from time t3, due to heat generated from the heat-generating elements 1121 of all the channels, Thereafter, the first measured temperature continues to rise, and the first measured temperature reaches an upper reference temperature TRU at time t4. Then, the control unit 121 sets the switch element 1122 of a channel (CH1, CH2, and CH3) executing a balance operation among the channels corresponding to the first temperature sensor 111 to an OFF state, and stops the balance operation of the channel. Since the balance operation is stopped in CH1, CH2, and CH3, heat generation of the heat-generating elements 1121 of the channels calms down, and the first measured temperature begins to decrease.

Thereafter, the first measured temperature drops down to a lower reference temperature TRL at time t5. Then, the control unit 121 restarts a balance operation of a channel of which a balance frequency FBAL is an ON period $T_{on}$ among the channels (CH1, CH2, and CH3) corresponding to the first temperature sensor 111. In the example in FIG. 15, all the channels are in the ON period $T_{on}$. Thus, the control unit 121 sets the switch elements 1122 of all the channels to an ON state, and a balance operation is restarted in all the channels. Consequently, the voltage difference of each channel begins to decrease again, and the first measured temperature begins to rise again.

Thereafter, the voltage difference ΔVB between the battery cell 311 of CH1 and the lowest voltage cell reaches $\Delta VB_{off}$ at time t6. Then, the control unit 121 sets the switch element 1122 of CH1 to an OFF state before time t7 at which the ON period $T_{on}$ of CH1 ends, and completes the balance operation of CH1. Since the cell balance operation is executed in only CH2 and CH3 from time t6, the first measured temperature decreases.

Thereafter, the ON period $T_{on}$ ends in CH2 and CH3 respectively at time t8 and time t9. Then, the control unit 121 sets the switch element 1122 of CH2 to an OFF state at time t8, and stops the balance operation of CH2. The control unit 121 also sets the switch element 1122 of CH3 to an OFF state at time t9, and stops the balance operation of CH3.

In addition, as described in FIG. 11, the control unit 121 completes the balance operation in CH2 and CH3 when the voltage difference ΔVB, after occurrence of voltage rebound, is equal to or less than a predetermined threshold value (an intermediate value between $\Delta VB_{on}$ and $\Delta VB_{off}$, for example) at a time of entering a next ON period $T_{on}$ after a lapse of the OFF period $T_{off}$. When the voltage difference ΔVB between the battery cell 311 of each channel and the lowest voltage cell is more than the predetermined threshold value, the control unit 121 continues the balance operation of the channel in a next cycle.

The flow of the balance operation of the power storage device in FIG. 15 is similar to that in the flowchart illustrated in FIG. 12, except for the following point.

When the determination in S105 indicates that the first measured temperature is equal to or more than the upper reference temperature TRU (S105: YES), the control unit 121 stops the balance operations of all the channels (CH1, CH2, and CH3 in the example in FIG. 14) corresponding to the first temperature sensor 111 (S109). Then, the control unit 121 holds a state in which the balance operations of the channels are stopped until the first measured temperature becomes equal to or less than the lower reference temperature TRL (S110: NO). When the determination in S110 indicates that the first measured temperature drops down to the lower reference temperature TRL (S110: YES), the control unit 121 determines, for each of the channels stopped in S109, whether a balance frequency is an ON period $T_{on}$ or an OFF period $T_{off}$ (S111). Then, the control unit 121 restarts a balance operation for a channel of which the balance frequency is the ON period $T_{on}$ (S103), and performs determination in S108 for a channel of which the balance frequency is the OFF period $T_{off}$.

Figure 16:
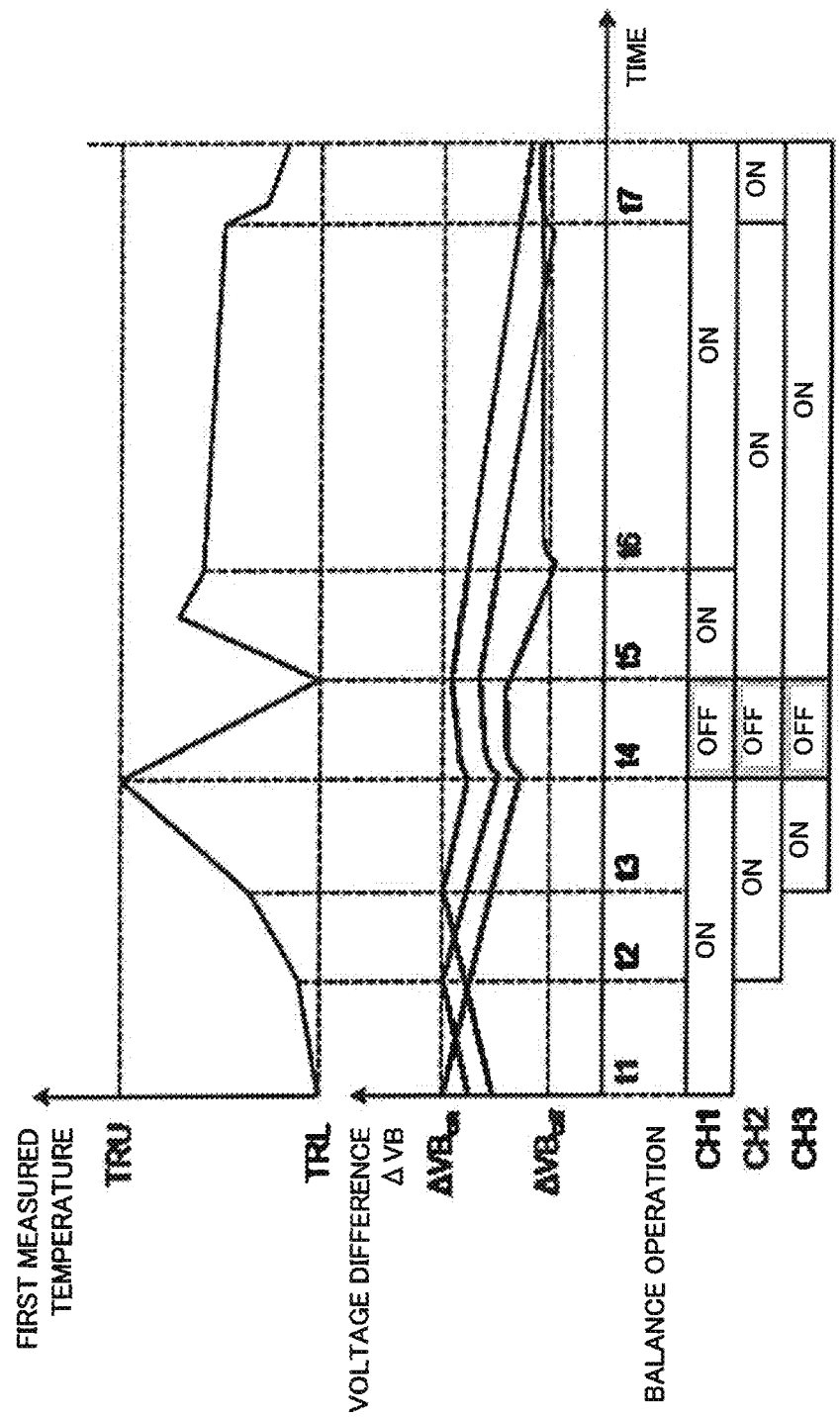
FIG. 16 is a diagram exemplifying a specific flow of a balance operation of each channel in the power storage device in FIG. 14.

Another example of a balance operation in the power storage device in FIG. 14 will be described by using FIG. 16. FIG. 16 is a diagram exemplifying a specific flow of a balance operation of each channel in the power storage device in FIG. 14. The present example is different from the case of FIG. 15 in that each channel does not have a frequency of a balance operation (a balance frequency FBAL).

A flow from time t1 to time t6 in FIG. 16 is similar to that in the case of FIG. 15. In the present example, since the balance frequency FBAL is absent, the control unit 121 continues a balance operation of each channel until a voltage difference ΔVB from a lowest voltage cell becomes $\Delta VB_{off}$, except for a period of time from when a first measured temperature becomes an upper reference temperature TRU to when the first measured temperature drops to a lower reference temperature TRL (from time t4 to time t5). In the example in FIG. 16, the voltage difference ΔVB between the battery cell 311 of CH2 and the lowest voltage cell becomes $\Delta VB_{off}$ at time t7, and the control unit 121 completes the balance operation of CH2 at time t7. Although not illustrated, the control unit 121 also completes the balance operation of CH3 when the voltage difference ΔVB between the battery cell 311 of CH3 and the lowest voltage cell becomes $\Delta VB_{off}$.

Figure 17:
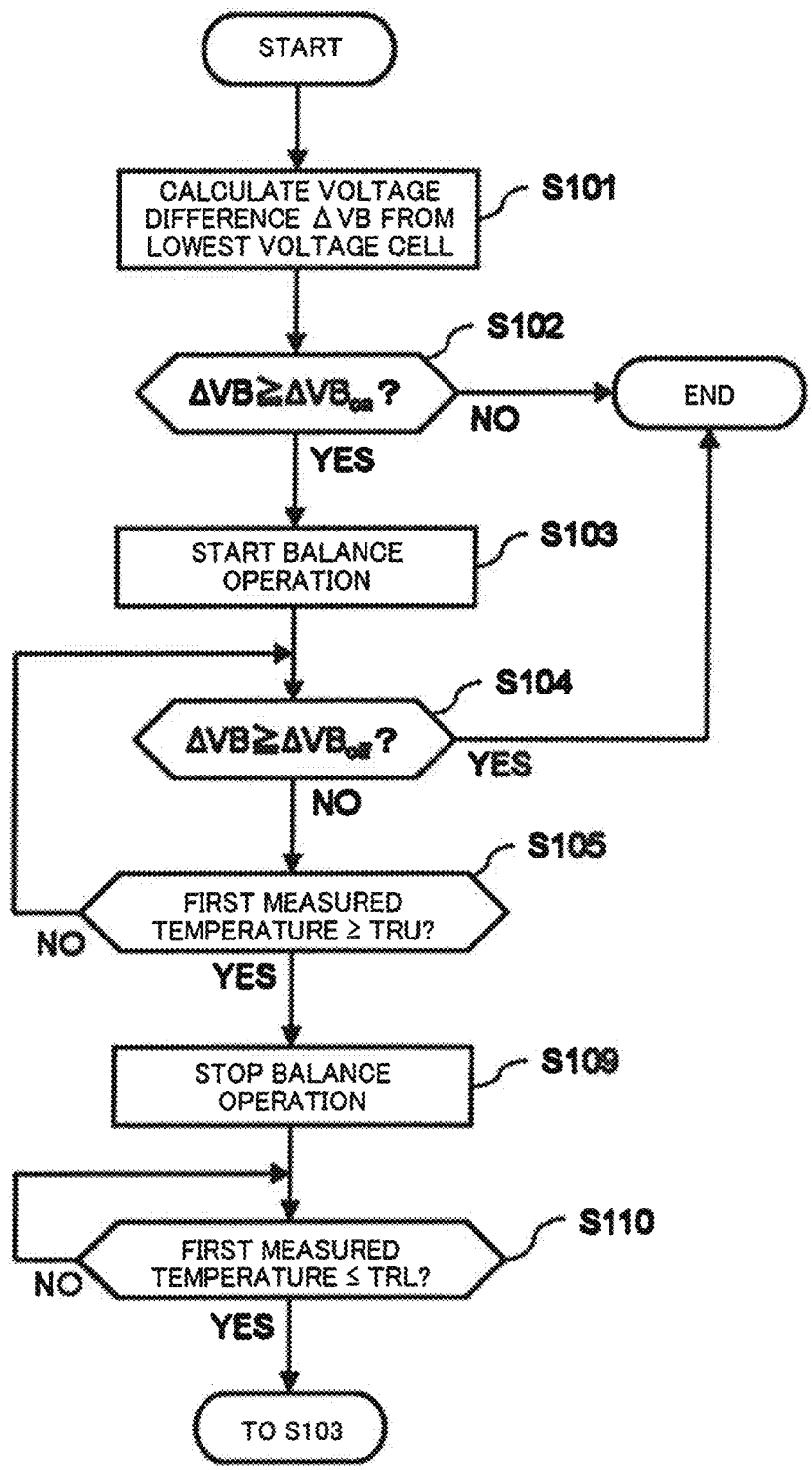
FIG. 17 is a flowchart illustrating a flow of processing of the balance operation in FIG. 16.

FIG. 17 is a flowchart illustrating a flow of processing of the balance operation in FIG. 16. The flowchart in FIG. 17 is different from the flowchart in FIG. 12 in that processing relating to a balance frequency FBAL is absent.

A flow of processing from S101 to S105 is similar to that in the flowchart in FIG. 12.

When the first measured temperature is less than the upper reference temperature TRU (S105: NO), processing from S104 is repeated. On the other hand, when the first measured temperature is equal to or more than the upper reference temperature TRU S105: YES), the control unit 121 stops the balance operations of all the channels (CH1, CH2, and CH3 in the example in FIG. 14) corresponding to the first temperature sensor 111 (S109). Then, the control unit 121 holds a state in which the balance operations of the channels are stopped until the first measured temperature becomes equal to or less than the lower reference temperature TRL (S110: NO). When the determination in S110 indicates that the first measured temperature drops down to the lower reference temperature TRL (S110: YES), the control unit 121 restarts the balance operation of each channel (S103).

Operation and Effect of First Example Embodiment

In the present example embodiment, as above, an operation of the balance circuit 112 that generates heat through a balance operation is controlled by a measured temperature of the first temperature sensor 111 corresponding to the balance circuit. Specifically, when a temperature that is measured by the first temperature sensor 111 corresponding to a certain balance circuit 112 becomes equal to or more than an upper reference temperature, a balance operation of the balance circuit 112 is stopped. This prevents the balance circuit 112 from generating heat to a fixed temperature or more, and enables to prevent decrease in service life of the battery cell 311 neighboring the balance circuit 112 as well as decrease in service life and operation reliability of components in a power storage device due to heat. In addition, the present example embodiment maintains a state in which the balance operation of the balance circuit 112 is stopped until a measured temperature of the first temperature sensor 111 drops to a lower reference temperature after the operation of the balance circuit 112 is stopped, This allows the heat-generated balance circuit 112 to cool down, and enables to prevent decrease in service life of the battery cell 311 as well as decrease in service life and operation reliability of components in a power storage device due to heat.

Second Example Embodiment

The present example embodiment is similar to the configuration of the first example embodiment, except that a power storage device further includes a second temperature sensor 13.

Processing Configuration

Figure 18:
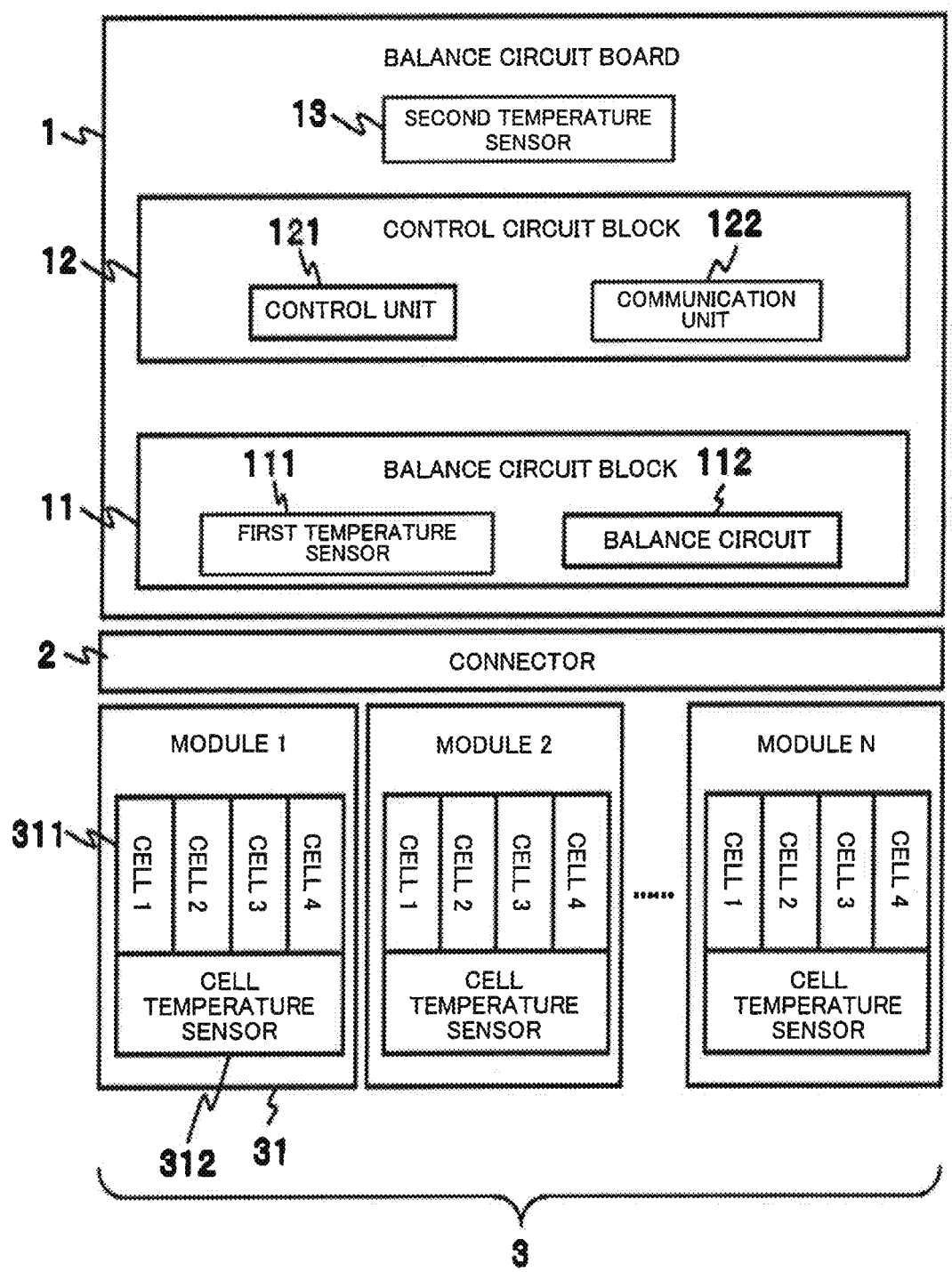
FIG. 18 is a diagram conceptually illustrating a processing configuration of a power storage device according to a second example embodiment.

FIG. 18 is a diagram conceptually illustrating a processing configuration of a power storage device according to a second example embodiment. As illustrated in FIG. 18, a balance circuit board 1 further includes a second temperature sensor 13. Unlike a first temperature sensor 111, the second temperature sensor 13 is provided for measuring an ambient temperature. Thus, the second temperature sensor 13 is provided at a position more distant from the balance circuit 112 than the first temperature sensor 111 is, so as not to be influenced by heat generation of each of balance circuits 112. A range not influenced by heat generated from the balance circuit 112 depends on a parameter such as a dimension of a balance circuit block 11, a thickness and thermal resistance of the balance circuit board 1, and layout of the balance circuit 112. For example, when the balance circuit board 1 is a printed circuit board (PCB) having a thickness of 1.6 cm and the balance circuit block 11 has a dimension of 10 cm square, the second temperature sensor 13 is provided at a position distant by 10 cm or more from an edge portion of the balance circuit block 11, for example. In addition, a range not influenced by heat generated from the balance circuit 112 can be grasped by carrying out a test operation or simulation of the balance circuit board 1 and measuring temperature distribution of the balance circuit board 1, for example. Accordingly, a position of the second temperature sensor 13 can be determined by using a result of the measurement.

The balance circuit board 1 preferably includes an isolation region that is a region for separating a region where the plurality of balance circuits 112 each including a heat-generating element 1121 as a main heat source are provided from a region where the second temperature sensor 13 is provided, and that is a region where no conductive pattern is provided. The conductive pattern is metal and generally has a higher thermal conductivity than that of a base material of the balance circuit board 1. Thus, the conductive pattern-free isolation region interposed between the region where the balance circuits 112 are provided and the region where the second temperature sensor 13 is provided can prevent heat from transferring to the second temperature sensor 13 through the balance circuit board 1. As a result, the second temperature sensor 13 can accurately measure an ambient temperature.

The second temperature sensor 13 may also be provided outside the balance circuit board 1, instead of on the balance circuit board 1. For example, the second temperature sensor 13 may be provided on a housing face of the power storage device, or may be provided in midair away from the balance circuit board 1 by a fixed distance or more, by means of a wire, a binding material, and the like. The second temperature sensor 13 may use a thermistor resistor, a semiconductor temperature sensor, an RTD, and the like, similarly to the first temperature sensor 111.

In a control unit 121 according to the present example embodiment, the control unit 121 controls a balance operation of each of the balance circuits 112, by using a difference temperature between a first measured temperature measured by the first temperature sensor 111 and a temperature measured by the second temperature sensor 13 (hereinafter, written as a second measured temperature), instead of using the first measured temperature. Since the difference temperature is a parameter different from the first measured temperature, the control unit 121 holds an upper reference temperature and a lower reference temperature (a second upper reference temperature and a second lower reference temperature) for the difference temperature, separately from an upper reference temperature and a lower reference temperature (a first upper reference temperature and a first lower reference temperature) that are set for the first measured temperature. The control unit 121 calculates the difference temperature between the first measured temperature and the second measured temperature. When the difference temperature is equal toot more than the second upper reference temperature, the control unit 121 stops the operation of the balance circuit 112 corresponding to the first temperature sensor 111. When the balance circuit 112 is stopped, heat generation of the balance circuit 112 calms down, and the first measured temperature begins to decrease. Then, the control unit 121 restarts the operation of the balance circuit 112 corresponding to the first temperature sensor 111 when the difference temperature between the first measured temperature measured by the first temperature sensor 111 and the second measured temperature measured by the second temperature sensor 13 becomes equal to or less than the second lower reference temperature that is lower than the second upper reference temperature.

Depending on an ambient temperature, the first measured temperature (an absolute temperature) measured by the first temperature sensor 111 may become equal to or more than the first upper reference temperature even when the difference temperature (in other words, a relative temperature relative to the ambient temperature) does not reach the second upper reference temperature. In this case, the balance circuit 112 has a possibility of continuing the balance operation while being in a state at the first upper reference temperature or more (in other words, a high temperature state that may possibly affect the neighboring battery cell 311 and other components adversely). In order to avoid continuing the operation of the balance circuit 112 in such a state, the control unit 121 may stop the operation of the balance circuit corresponding to the first temperature sensor 111 when the first measured temperature of the first temperature sensor 111 is equal to or more than the first upper reference temperature, regardless of the difference temperature. In this case, similarly to the first example embodiment, the control unit 121 maintains a state in which the corresponding balance circuit 112 is stopped until the first measured temperature becomes equal to or less than the first lower reference temperature.

Similarly to the first example embodiment, the control unit 121 according to the present example embodiment also stores programs for implementing the above-described functions of the present example embodiment in, for example, a not-illustrated storage region such as a ROM and a RAM. Further, the control unit 121 according to the present example embodiment implements the functions of the present example embodiment by executing the programs stored in the storage region by use of a not-illustrated CPU.

Circuit Configuration Example

Figure 19:
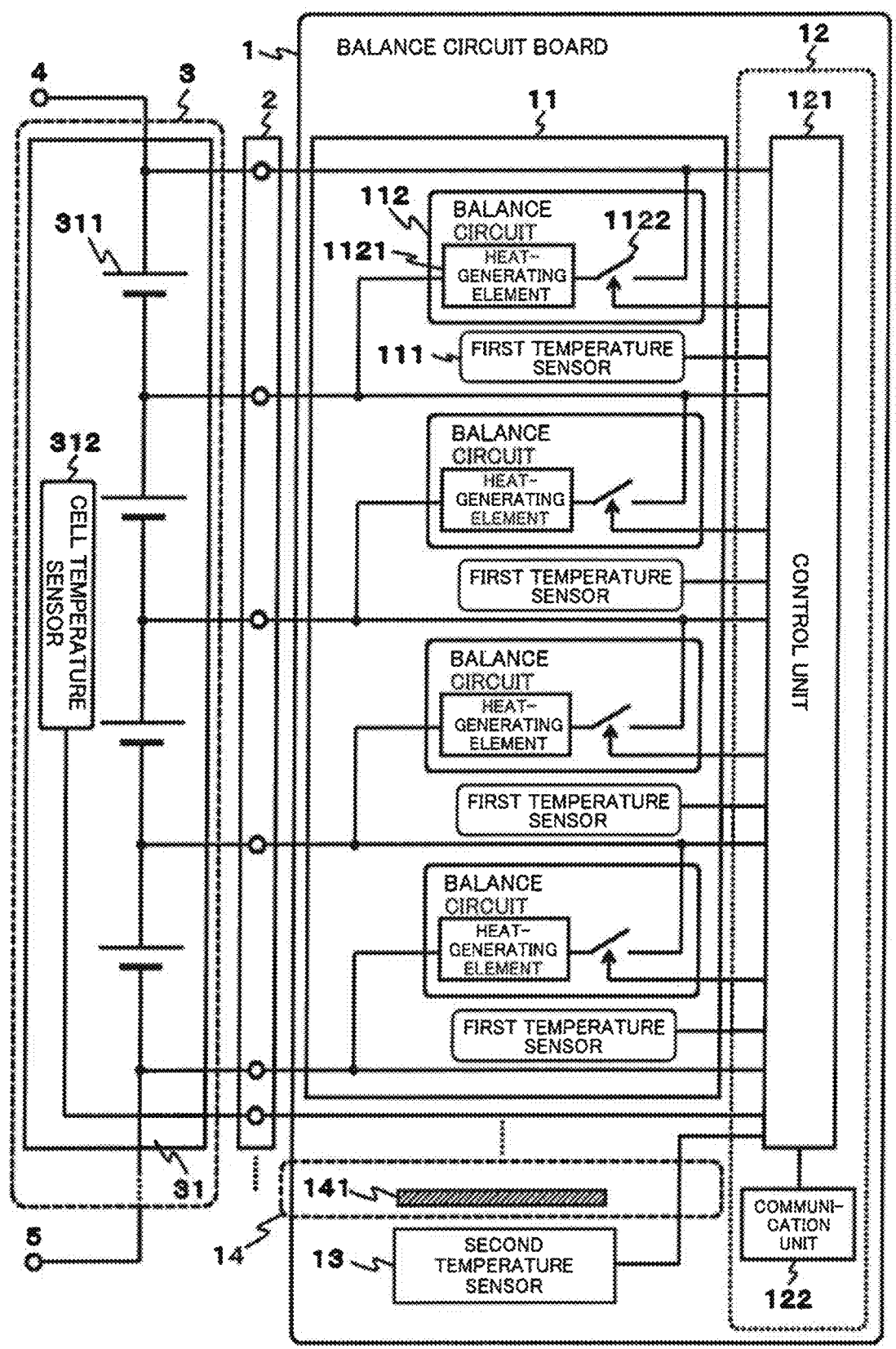
FIG. 19 is a diagram conceptually illustrating a circuit configuration example of the power storage device according to the second example embodiment.

FIG. 19 is a diagram conceptually illustrating a circuit configuration example of the power storage device according to the second example embodiment.

In the example in FIG. 19, the plurality of balance circuits 112, the first temperature sensor 111 corresponding to each balance circuit 112, and the second temperature sensor 13 are provided on the balance circuit board 1. Then, the balance circuit board 1 includes, in an isolation region 14 between the balance circuit 112 and the second temperature sensor 13, a through-hole region 141 that penetrates through the balance circuit board 1. Since the through-hole region 141 includes no conductive pattern, the through-hole region 141 serves a role of preventing heat from transferring from the balance circuit to the second temperature sensor 13 through the balance circuit board 1. Accordingly, even in such a case of being unable to assure a sufficient distance for preventing reception of heat generated from the balance circuit 112, the through-hole region 141 reduces heat transferring from the balance circuit 112, and the second temperature sensor 13 can accurately measure an ambient temperature.

Figure 20:
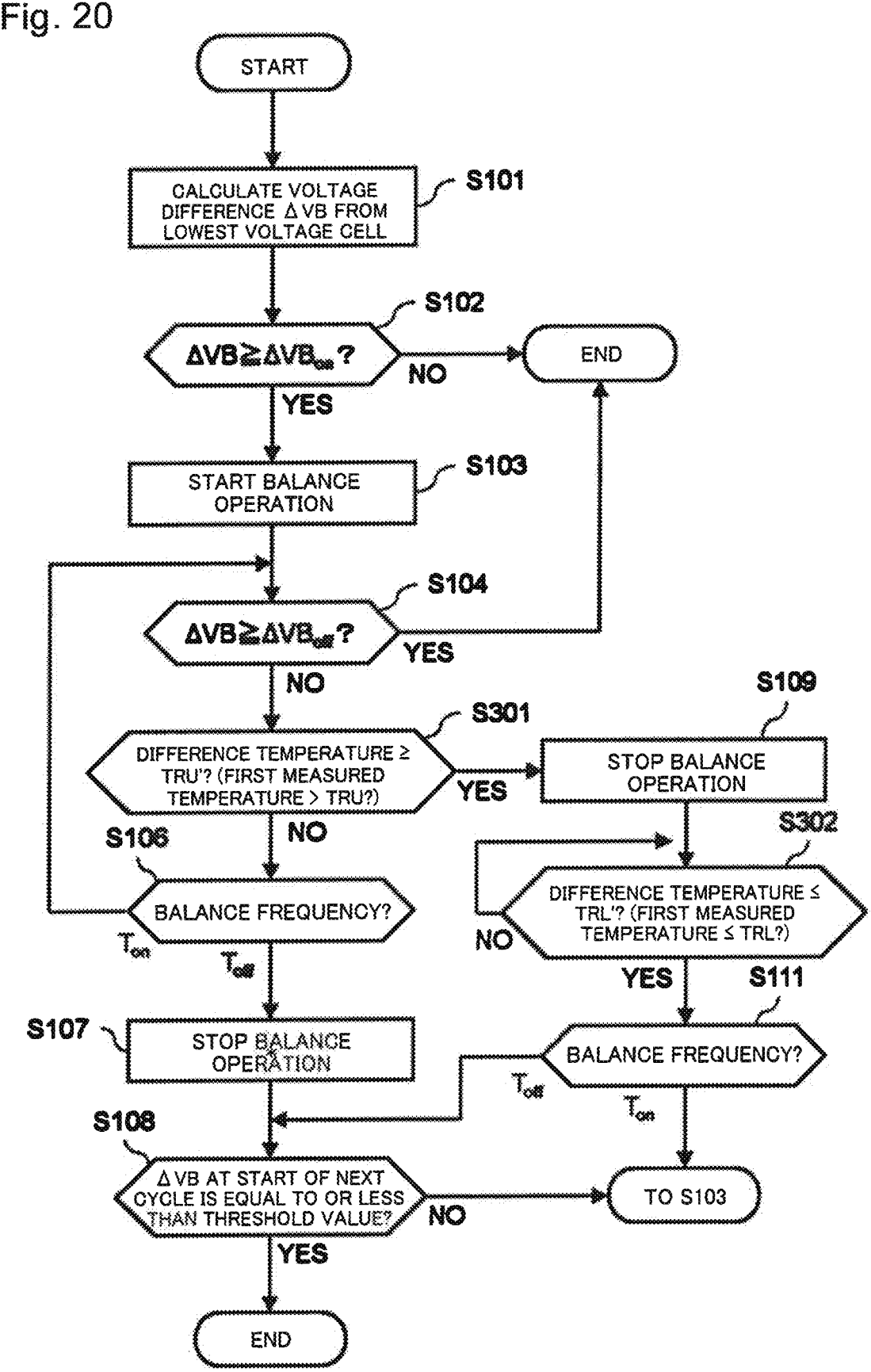
FIG. 20 is a flowchart illustrating a flow of a balance operation in the power storage device in FIG. 19.

FIG. 20 is a flowchart illustrating a flow of a balance operation in the power storage device in FIG. 19. The flowchart in FIG. 20 is based on the flowchart in FIG. 12, and is similar to the flowchart in FIG. 15 except for processing of S301 and S302, In the following, the processing of S301 and S302 will be mainly described.

When the voltage difference ΔVB from the lowest voltage cell is not equal to or less than $\Delta VB_{off}$ (S104: YES) after starting a balance operation (S103), the control unit 121 determines whether or not a difference temperature that is calculated by using a first measured temperature measured by the first temperature sensor 111 and a second measured temperature measured by the second temperature sensor 13 is equal to or more than a second upper reference temperature TRU', or whether or not the first measured temperature is equal to or more than a first upper reference temperature TRU (S301). When the difference temperature is equal to or more than the second upper reference temperature TRU', or when the first measured temperature is equal to or more than the first upper reference temperature TRU (S301: YES), the control unit 121 stops a balance operation of a channel corresponding to the first temperature sensor 111 (S109). When a balance operation is stopped because the difference temperature becomes equal to or more than the second upper reference temperature TRU', the control unit 121 maintains a state in which the balance operation is stopped until the difference temperature becomes equal to or less than a second lower reference temperature TRL' (S302: NO). Alternatively, when a balance operation is stopped because the first measured temperature becomes equal to or more than the first upper reference temperature TRU, the control unit 121 maintains a state in which the balance operation is stopped until the first measured temperature becomes equal to or less than a first lower reference temperature TRL (S302: NO). When the first measured temperature decreases because the balance operation is stopped and the difference temperature becomes equal to or less than the second lower reference temperature TRL', or when the first measured temperature becomes equal to or less than the first lower reference temperature TRL (S302: YES), the control unit 121 restarts the balance operation (S103) when a balance frequency of the channel is an ON period Ton (S111: $T_{on}$).

Operation and Effect of Second Example Embodiment

In the present example embodiment, as above, an operation of each of the balance circuits 112 is controlled by a difference temperature that is obtained by subtracting an ambient temperature measured by the second temperature sensor 13 from a temperature measured by the first temperature sensor 111. This makes it possible to control each of the balance circuits 112 by using heat generated in each balance circuit 112 as a parameter.

As above, the example embodiments of the present invention have been described with reference to the drawings. However, these are examples of the present invention, and various configurations other than the above may be also employed.

For example, the control unit 121 may change the first upper reference temperature or the second upper reference temperature in accordance with magnitude of a variation in voltage between a plurality of battery cells. For example, the control unit 121 may be configured to add, to the first upper reference temperature or the second upper reference temperature held in advance, a correction value that takes a larger value for the larger voltage difference ΔVB between each battery cell 311 and the lowest voltage cell. Accordingly, when the voltage difference ΔVB is large, in other words, when a balance between a certain battery cell 311 and the lowest voltage cell is largely disrupted, the first upper reference temperature or the second upper reference temperature is increased, and a balance operation of the balance circuit 112 corresponding to the battery cell 311 becomes less likely to be stopped. As a result, when a balance between the battery cells is largely disrupted, it becomes possible to equalize voltages of the plurality of battery cells 311 in a shorter time.

In addition, since the plurality of battery cells 311 are connected in series, a balance operation may possibly rather lower discharge energy especially in the case of a passive balance type. In view of this, In the case where a balance operation is performed when charging the battery cell 311, the control unit 121 may use a first upper reference temperature or a second upper reference temperature that is higher than the temperature when discharging the battery cell 311. In this case, the control unit 121 holds in advance, in a not-illustrated storage region, a first upper reference temperature or a second upper reference temperature at the time of charging, and a first upper reference temperature or a second upper reference temperature at the time of discharging that is lower than the first upper reference temperature or the second upper reference temperature at the time of charging, for example. Such a configuration reduces time for performing a balance operation when charging, and can prevent discharge energy of a power storage device from decreasing.

In addition, in the plurality of flowcharts used in the above description, a plurality of steps (processes) are described in order, but execution order of the steps to be executed in each of the example embodiments is not limited to the order of the description. In each of the example embodiments, the order of the illustrated steps may be changed as far as the change does not detract from contents. The above-described example embodiments may also be combined as far as contents do not conflict with each other.

Hereinafter, examples of reference modes will be supplementary noted.

A power storage device including:
a plurality of series-connected battery cells;
a balance circuit that is provided for each of the plurality of battery cells, and is connected with corresponding one of the battery cells;
a first temperature sensor that is provided for every one or more of the balance circuits, and measures a temperature of a corresponding balance circuit; and
a control means that stops an operation of the corresponding balance circuit when a first measured temperature measured by the first temperature sensor is equal to or more than a first upper reference temperature, and restarts an operation of the corresponding balance circuit when the first measured temperature becomes equal to or less than a first lower reference temperature that is lower than the first upper reference temperature after an operation of the corresponding balance circuit is stopped.

The power storage device as described above, wherein the balance circuit includes a resistive element that consumes discharge energy of the battery cell corresponding to the balance circuit, in order to reduce a voltage difference between the plurality of battery cells.

The power storage device as described above further including a communicating means that outputs, to outside, information capable of specifying the balance circuit or a battery cell corresponding to the balance circuit when an operation stop time of the balance circuit due to the first measured temperature becoming equal to or more than the first upper reference temperature exceeds a reference value per unit time, or when an operation stop number-of-times of the balance circuit due to the first measured temperature becoming equal to or more than the first upper reference temperature exceeds a reference number-of-times per unit time.

The power storage device as described above further including a second temperature sensor that is more distant from the balance circuit than the first temperature sensor is, wherein
the control means
uses, instead of the first measured temperature, a difference temperature between the first measured temperature and a second measured temperature measured by the second temperature sensor, stops an operation of the corresponding balance circuit when the difference temperature is equal to or more than a second upper reference temperature, and restarts an operation of the corresponding balance circuit when the difference temperature becomes equal to or less than a second lower reference temperature after an operation of the corresponding balance circuit is stopped.

The power storage device as described above, wherein
the plurality of balance circuits, the first temperature sensor, and the second temperature sensor are provided on an identical circuit board, and
the circuit board includes a through-hole region that penetrates through the circuit board between the balance circuit and the second temperature sensor.

The power storage device as described above, wherein
the control means
stops an operation of the corresponding balance circuit when the first measured temperature is equal to or more than the first upper reference temperature, regardless of the difference temperature.

The power storage device as described above, wherein
a difference between the upper reference temperature and the lower reference temperature is 5° C. or more.

The power storage device as described above, wherein
the control means
changes the upper reference temperature in accordance with magnitude of a variation in voltage between the plurality of battery cells.

power storage device as described above, wherein
the control means
uses, when charging the plurality of battery cells, the upper reference temperature that is higher than temperature when discharging the plurality of battery cells.

A cell balance operation method including,
by a power storage device that includes:
a plurality of series-connected battery cells;
a balance circuit that is provided for each of the plurality of battery cells, and is connected with corresponding one of the battery cells; and
a first temperature sensor that is provided for every one or more of the balance circuits, and measures a temperature of a corresponding balance circuit,
stopping an operation of the corresponding balance circuit when a first measured temperature measured by the first temperature sensor is equal to or more than a first upper reference temperature, and restarting an operation of the corresponding balance circuit when the first measured temperature becomes equal to or less than a first lower reference temperature that is lower than the first upper reference temperature after an operation of the corresponding balance circuit is stopped.

The cell balance operation method as described above, further including
having, in the balance circuit, a resistive element that consumes discharge energy of the battery cell corresponding to the balance circuit, in order to reduce a voltage difference between the plurality of battery cells.

The cell balance operation method as described above, further including,
by the power storage device,
outputting, to outside, information capable of specifying the balance circuit or a battery cell corresponding to the balance circuit when an operation stop time of the balance circuit due to the first measured temperature becoming equal to or more than the first upper reference temperature exceeds a reference value per unit time, or when an operation stop number-of-times of the balance circuit due to the first measured temperature becoming equal to or more than the first upper reference temperature exceeds a reference number-of-times per unit time.

The cell balance operation method as described above, by the power storage device that further includes a second temperature sensor that is more distant from the balance circuit than the first temperature sensor is, the method including
using, instead of the first measured temperature, a difference temperature between the first measured temperature and a second measured temperature measured by the second temperature sensor, stopping an operation of the corresponding balance circuit when the difference temperature is equal to or more than a second upper reference temperature, and restarting an operation of the corresponding balance circuit when the difference temperature becomes equal to or less than a second lower reference temperature after an operation of the corresponding balance circuit is stopped.

The cell balance operation method as described above, including:
providing the plurality of balance circuits, the first temperature sensor, and the second temperature sensor on an identical circuit board; and
having, in the circuit board, a through-hole region that penetrates through the circuit board between the balance circuit and the second temperature sensor.

The cell balance operation method as described above including,
by the power storage device,
stopping an operation of the corresponding balance circuit when the first measured temperature is equal to or more than the first upper reference temperature, regardless of the difference temperature.

The cell balance operation method as described above, including
setting a difference between the upper reference temperature and the lower reference temperature to be 5° C. or more.

The cell balance operation method as described above, including,
by the power storage device,
changing the upper reference temperature in accordance with magnitude of a variation in voltage between the plurality of battery cells.

The cell balance operation method as described above, including by the power storage device,
using, when charging the plurality of battery cells, the upper reference temperature that is higher than temperature when discharging the plurality of battery cells.

A program for causing a power storage device that includes:
- a plurality of series-connected battery cells;
- a balance circuit that is provided for each of the plurality of battery cells, and is connected with corresponding one of the battery cells; and
- a first temperature sensor that is provided for every one or more of the balance circuits, and measures a temperature of a corresponding balance circuit, to implement a control function of
stopping an operation of the corresponding balance circuit when a first measured temperature measured by the first temperature sensor is equal to or more than a first upper reference temperature, and restarting an operation of the corresponding balance circuit when the first measured temperature becomes equal to or less than a first lower reference temperature that is lower than the first upper reference temperature after an operation of the corresponding balance circuit is stopped.

The program as described above, for causing the power storage device to further implement a communication function of
outputting, to outside, information capable of specifying the balance circuit or a battery cell corresponding to the balance circuit when an operation stop time of the balance circuit due to the first measured temperature becoming equal to or more than the first upper reference temperature exceeds a reference value per unit time, or when an operation stop number-of-times of the balance circuit due to the first measured temperature becoming equal to or more than the first upper reference temperature exceeds a reference number-of-times per unit time.

The program as described above, for causing the power storage device that further includes a second temperature sensor that is more distant from the balance circuit than the first temperature sensor is, to implement a function of
using, instead of the first measured temperature, a difference temperature between the first measured temperature and a second measured temperature measured by the second temperature sensor, stopping an operation of the corresponding balance circuit when the difference temperature is equal to or more than a second upper reference temperature, and restarting an operation of the corresponding balance circuit when the difference temperature becomes equal to or less than a second lower reference temperature after an operation of the corresponding balance circuit is stopped.

The program as described above, for causing the power storage device to implement a function of
stopping an operation of the corresponding balance circuit when the first measured temperature is equal to or more than the first upper reference temperature, regardless of the difference temperature.

The program as described above, wherein
a difference between the upper reference temperature and the lower reference temperature is 5° C. or more.

The program as described above, for causing the power storage device to implement a function of
changing the upper reference temperature in accordance with magnitude of a variation in voltage between the plurality of battery cells.

The program as described above, for causing the power storage device to implement a function of
using, when charging the plurality of battery cells, the upper reference temperature that is higher than temperature when discharging the plurality of battery cells.

This application is based upon and claims the benefit of priority from Japanese Patent Application No. 2015-105597, filed on May 25, 2015, the disclosure of which is incorporated herein in its entirety.

The invention claimed is:

1. A power storage device comprising:
a plurality of series-connected battery cells;
a balance circuit that is provided for each of the plurality of battery cells, and is connected with corresponding one of the battery cells;
a first temperature sensor that is provided for every one or more of the balance circuits, and measures a temperature of a corresponding balance circuit; and
a controller that stops an operation of the corresponding balance circuit when a first measured temperature measured by the first temperature sensor is equal to or more than a first upper reference temperature, and restarts an operation of the corresponding balance circuit when the first measured temperature becomes equal to or less than a first lower reference temperature that is lower than the first upper reference temperature after an operation of the corresponding balance circuit is stopped,
wherein the balance circuit includes a resistive element that consumes discharge energy of the battery cell corresponding to the balance circuit, in order to reduce a voltage difference between the plurality of battery cells.

2. The power storage device according to claim 1, further comprising
a communication unit that outputs, information to an external monitoring device,
wherein the information is capable of specifying the balance circuit or a battery cell corresponding to the balance circuit when an operation stop time of the balance circuit due to the first measured temperature becoming equal to or more than the first upper reference temperature exceeds a reference value per unit time, or when an operation stop number-of-times of the balance circuit due to the first measured temperature becoming equal to or more than the first upper reference temperature exceeds a reference number-of-times per unit time.

3. The power storage device according to claim 1, further comprising a second temperature sensor that is more distant from the balance circuit than the first temperature sensor is, wherein
the controller uses, instead of the first measured temperature, a difference temperature between the first measured temperature and a second measured temperature measured by the second temperature sensor, stops an operation of the corresponding balance circuit when the difference temperature is equal to or more than a second upper reference temperature, and restarts an operation of the corresponding balance circuit when the difference temperature becomes equal to or less than a second lower reference temperature after an operation of the corresponding balance circuit is stopped.

4. The power storage device according to claim 3, wherein the plurality of balance circuits, the first temperature sensor, and the second temperature sensor are provided on an identical circuit board, and the circuit board includes a through-hole region that penetrates through the circuit board between the balance circuit and the second temperature sensor.

5. The power storage device according to claim 3, wherein the controller stops an operation of the corresponding balance circuit
when the first measured temperature is equal to or more than the first upper reference temperature, regardless of the difference temperature.

6. The power storage device according to claim 1, wherein a difference between the first upper reference temperature and the first lower reference temperature is 5° C. or more and 10° C. or less.

7. The power storage device according to claim 1, wherein the controller changes the first upper reference temperature depending on magnitude of a variation in voltage between the plurality of battery cells.

8. The power storage device according to claim 1, wherein the controller uses, when charging the plurality of battery cells, the first upper reference temperature that is higher than a temperature when discharging the plurality of battery cells.

9. A cell balance operation method performed by a power storage device, wherein the power storage device includes:
a plurality of series-connected battery cells;
a balance circuit that is provided for each of the plurality of battery cells, and is connected with corresponding one of the battery cells; and
a first temperature sensor that is provided for every one or more of the balance circuits, and measures a temperature of a corresponding balance circuit,
wherein the balance circuit includes a resistive element that consumes discharge energy of the battery cell corresponding to the balance circuit, in order to reduce a voltage difference between the plurality of battery cells,
the method comprising:
stopping an operation of the corresponding balance circuit when a first measured temperature measured by the first temperature sensor is equal to or more than a first upper reference temperature; and
restarting an operation of the corresponding balance circuit when the first measured temperature becomes equal to or less than a first lower reference temperature that is lower than the first upper reference temperature after an operation of the corresponding balance circuit is stopped.

10. A non-transitory computer-readable recording medium that records a program for causing a power storage device to implement a control function, wherein the power storage device-includes:
a plurality of series-connected battery cells;
a balance circuit that is provided for each of the plurality of battery cells, and is connected with corresponding one of the battery cells; and
a first temperature sensor that is provided for every one or more of the balance circuits, and measures a temperature of a corresponding balance circuit,
wherein the balance circuit includes a resistive element that consumes discharge energy of the battery cell corresponding to the balance circuit, in order to reduce a voltage difference between the plurality of battery cells,
the control function comprising:
stopping an operation of the corresponding balance circuit when a first measured temperature measured by the first temperature sensor is equal to or more than a first upper reference temperature; and
restarting an operation of the corresponding balance circuit when the first measured temperature becomes equal to or less than a first lower reference temperature that is lower than the first upper reference temperature after an operation of the corresponding balance circuit is stopped.

* * * * *